United States Patent
Carlson

(10) Patent No.: US 10,843,608 B2
(45) Date of Patent: Nov. 24, 2020

(54) PERSONAL SHIELD DEVICES, SYSTEMS AND METHODS

(71) Applicant: Madelyne Carlson, Lino Lakes, MN (US)

(72) Inventor: Madelyne Carlson, Lino Lakes, MN (US)

( * ) Notice: Subject to any disclaimer, the term of this patent is extended or adjusted under 35 U.S.C. 154(b) by 84 days.

(21) Appl. No.: 16/041,367

(22) Filed: Jul. 20, 2018

(65) Prior Publication Data

US 2019/0152371 A1    May 23, 2019

Related U.S. Application Data

(60) Provisional application No. 62/588,327, filed on Nov. 18, 2017.

(51) Int. Cl.
| | |
|---|---|
| *B60N 2/885* | (2018.01) |
| *B60N 2/882* | (2018.01) |
| *B60N 2/879* | (2018.01) |

(52) U.S. Cl.
CPC .......... *B60N 2/885* (2018.02); *B60N 2/879* (2018.02); *B60N 2/882* (2018.02)

(58) Field of Classification Search
CPC ................... B60N 2/885; B60N 2/882
See application file for complete search history.

(56) References Cited

U.S. PATENT DOCUMENTS

| | | | | |
|---|---|---|---|---|
| 2,460,942 | A * | 2/1949 | Marshall | B61D 33/005 |
| | | | | 297/399 |
| 2,464,435 | A * | 3/1949 | Conradt | B60R 11/0217 |
| | | | | 297/397 |
| 3,578,383 | A * | 5/1971 | Earl | A47C 7/383 |
| | | | | 297/391 |
| 4,440,443 | A * | 4/1984 | Nordskog | A47C 7/38 |
| | | | | 297/397 |
| 5,586,810 | A * | 12/1996 | Liu | A47C 7/38 |
| | | | | 297/406 |
| 5,613,736 | A * | 3/1997 | Schaked | A47C 7/386 |
| | | | | 297/397 |
| 6,460,927 | B1 | 10/2002 | Groth | |
| 6,648,416 | B2 * | 11/2003 | O'Connor | A47C 7/383 |
| | | | | 297/397 |
| 6,935,695 | B2 * | 8/2005 | Carta Gonzalez | A47C 7/383 |
| | | | | 297/397 |
| 7,204,557 | B1 | 4/2007 | Burton | |
| 7,393,057 | B2 * | 7/2008 | Fraser | A47C 7/383 |
| | | | | 297/392 |
| 9,375,091 | B1 | 6/2016 | Baker | |
| 9,855,874 | B2 * | 1/2018 | Sanchez | B60N 2/882 |
| 2006/0250015 | A1 | 11/2006 | Buck | |
| 2010/0289315 | A1 * | 11/2010 | Jackson | B60N 2/2851 |
| | | | | 297/397 |

(Continued)

*Primary Examiner* — David R Dunn
*Assistant Examiner* — Tania Abraham
(74) *Attorney, Agent, or Firm* — Fish & Richardson P.C.

(57) ABSTRACT

In general, privacy apparatuses, systems, and methods are described. In one embodiment, a privacy apparatus supportable on a backrest of a seat is provided, including a frame including first and second supports, a connecting member that extends between the supports, and first and second shield panels connected to the supports. The privacy apparatus can serve as privacy shield and/or head/neck support for a user or vehicular passenger.

20 Claims, 17 Drawing Sheets

(56) References Cited

U.S. PATENT DOCUMENTS

2012/0007405 A1* 1/2012 Kim ..................... B60N 2/885
 297/397
2012/0104807 A1 5/2012 Lauchle et al.
2012/0299356 A1 11/2012 Edwards
2014/0101823 A1 4/2014 Thomson

* cited by examiner

PERSONAL SHIELD DEVICES, SYSTEMS AND METHODS

CROSS-REFERENCE TO RELATED APPLICATIONS

This application claims the benefit of U.S. Provisional Patent Application Ser. No. 62/588,327, filed on Nov. 18, 2017. The entire contents of the foregoing are incorporated herein by reference.

TECHNICAL FIELD

This disclosure describes shielding apparatuses, systems, and methods, and in some embodiments, portable privacy shields for individuals or vehicular passengers. This disclosure also describes passenger seats and passenger seat backrests including a privacy apparatus.

BACKGROUND

Passenger seats on vehicles such as buses, trains, airplanes, and the like, typically offer backrests or backrest cushions for passengers. Passenger seats are often arranged in the vehicle in close proximity to one another, often based on increasing the number of passenger seats that can be accommodated within the vehicle. Various solutions have been provided to accommodate passenger comfort. Typical passenger seats are in close proximity or in direct contact with an adjacent seat, and passengers are in close physical proximity to one another.

SUMMARY

There is a need for a device which enables a passenger to enjoy improved privacy and for a more relaxing travel experience.

Some embodiments described herein include privacy apparatuses, including portable privacy shields and/or collapsible privacy shields for use by individuals, including passengers of vehicles such as commercial planes, buses, and the like. Also provided herein are passenger seats and passenger seat backrests comprising or having attached thereto the privacy apparatuses described herein.

In some aspects, apparatuses provided herein relate to creating a temporary shield from adjacent seats on a passenger vehicle such as a bus, train, airplane, or the like, wherein the temporary shield attaches to the backrest of the passenger seat. The divider shields, or shield panels, can, in some aspects, provide an adjustable height (e.g., vertically) to accommodate different heights of passengers. Some embodiments of the apparatuses described herein are adjustable for different heights or widths of seat backrests or backrest cushions. Some embodiments of the apparatuses described herein can also be collapsible, giving the user the ability to retract an apparatus to a smaller size for portability and storage.

In some optional embodiments, a portable privacy apparatus may be carried by a user in a compact configuration. At a time of use, the apparatus may be opened and supported on a backrest of the user's seat such that one or more shield panels extend on lateral sides of the user. The presence of the shield panels may provide a barrier to the user's surroundings, such as a visual, audio, or other barrier to shield the user's view, reduce transmission of sound, reduce the view of the user by other persons in the vicinity, shield from germs from the surroundings (e.g., due to coughing, sneezing, etc.). Alternatively or additionally, the portable privacy apparatus may provide a support for the user, such as a support for the user's head, neck, etc.

Particular embodiments described herein provide a privacy apparatus, comprising a frame, comprising a left vertical support, a right vertical support, and a first connecting member that extends between the left and right vertical supports, the first connecting member connected to the left vertical support and the right vertical support, a first shield panel connected to the left vertical support, and a second shield panel connected to the right vertical support.

In some implementations, the privacy apparatus may optionally include one or more of the following features. The first shield panel may be movable along at least a portion of the left vertical support between two or more selected positions, and the second shield panel may be movable along at least a portion of the right vertical support between two or more selected positions. The first shield panel and the left vertical support, and the second shield panel and the right vertical support, may include complementary mating features configured to maintain the first and second shield panels in one of the selected positions. The frame may be manually adjustable between an open configuration and a collapsed configuration. In the open configuration, a minimum distance between the left vertical support and the right vertical support may be greater than 6 inches, and in the collapsed configuration, a minimum distance between the left vertical support and the right vertical support may be less than 1 inch. In the open configuration the first connecting member may be perpendicular to the left vertical support and the right vertical support, and in the collapsed configuration the first connecting member may be parallel with the left vertical support and the right vertical support. The first shield panel and the second shield panel may be removably connected to the frame. Substantially all of the first and second panels may extend away from the frame in a first direction. The first direction may be substantially perpendicular to the first connecting member. The left vertical support may be substantially parallel to the right vertical support. A second connecting member may extend between the left and right vertical supports, and may be connected to the left vertical support and the right vertical support. The second connecting member may be substantially parallel with the first connecting member. The frame may be configured to be supported on a backrest of a seat, the first connecting member configured to rest on a top surface of the backrest while the second connecting member extends across a front of the backrest. The frame may be configured to support the first and second shield panels in a fixed position, and the privacy apparatus does not include a connecting member that extends behind the backrest. The first connecting member may be disposed between a first side and a second side of the left vertical support and between a first side and a second side of the right vertical support. The first connecting member may be rigid. The first connecting member may include a first connecting member portion pivotally connected with a second connecting member portion. The second connecting member may be an elastic strap.

Particular embodiments described herein provide a method of using a privacy apparatus, comprising positioning a privacy apparatus on a backrest of a seat, the privacy apparatus comprising a frame including first and second vertical supports and a first connecting member that extends between the first and second vertical supports, the first connecting member connected to the first vertical support and the second vertical support, a first shield panel connected to the first vertical support, and a second shield panel connected to the second vertical support, the first connecting member at least partially supported on a top of the backrest when the privacy shield is supported on the backrest, and supporting a user's head on the first shield panel.

In some implementations, the method may optionally including one or more of the following features. The method may include removing the privacy apparatus from the backrest. The method may include manipulating the privacy apparatus from an open configuration in which the privacy apparatus is positionable on the backrest to a collapsed configuration, wherein in the open configuration, a distance between the left vertical support and the right vertical support is substantially equal to a width of the backrest, and in the collapsed configuration, a distance between the left vertical support and the right vertical support is less than 20% of the width of the backrest.

The apparatuses, backrests, passenger seats, and systems described herein provide several advantages. First, some apparatuses described herein may enhance the privacy of a user. For example, the apparatus may include one or more shield panels extending on lateral sides of the user (e.g., on lateral sides of the user's head) that provide a zone of privacy separated from the surrounding environment. The shield panels may provide a visual barrier that limits the user's field of view and/or limits the view of the user by nearby persons.

Second, one or more of the privacy apparatuses described herein may help people who experience anxiety in crowded areas such as in commercial passenger vehicles. An additional barrier may provide separation from the environment to reduce a level of stimulation received by the user.

Third, one or more of the privacy apparatuses described herein may increase the ability of a user to relax or rest with the shield panels in place. For example, the shield panels may provide a physical support for a user to rest their head, neck, etc. The ergonomics and comfort of a seat may be improved, and user comfort enhanced, particularly when the user occupies the seat for an extended period of time. Alternatively, or additionally, the privacy apparatus may facilitate a zone of personal space separated from the surrounding environment that promotes comfort.

Fourth, one or more of the apparatuses described herein are configured to be portable and/or collapsible. For example, in some optional embodiments, a user may easily fit a privacy apparatus in a bag and/or easily take a privacy apparatus to whatever locations the user desires. The privacy apparatus may thus be readily transported in a collapsed configuration and manipulated into an open configuration at a time of use.

Fifth, some embodiments may provide a physical barrier from the surrounding environment that promotes health and well-being. For example, the shield panels may provide a barrier from persons in close proximity to the user, providing a shield against coughing, sneezing, and/or other airborne germs.

Unless otherwise defined, all technical and scientific terms used herein have the same meaning as commonly understood by one of ordinary skill in the art to which this invention belongs. Methods, components, and materials are described herein for use in the present invention; other, suitable methods, components, and materials known in the art can also be used. The materials, components, methods, and examples are illustrative only and not intended to be limiting.

Other features and advantages of the invention will be apparent from the following detailed description and figures, and from the claims.

DETAILED DESCRIPTION

A privacy apparatus 100, such as a portable privacy shield, according to one exemplary embodiment is shown in FIGS. 1A-1C, 2A-2D, 3A-3C, and 4A-4B. The privacy apparatus 100 is a modular apparatus that can be at least partially supported by passenger seat or passenger seat backrest to provide personal privacy, neck/head support, and/or other features and benefits to a user. Various features of the privacy apparatus 100 are described with reference to FIGS. 1A-1C, 2A-2D, 3A-3C, and is shown in use attached with a passenger seat in FIGS. 4A and 4B.

Figure 1A:
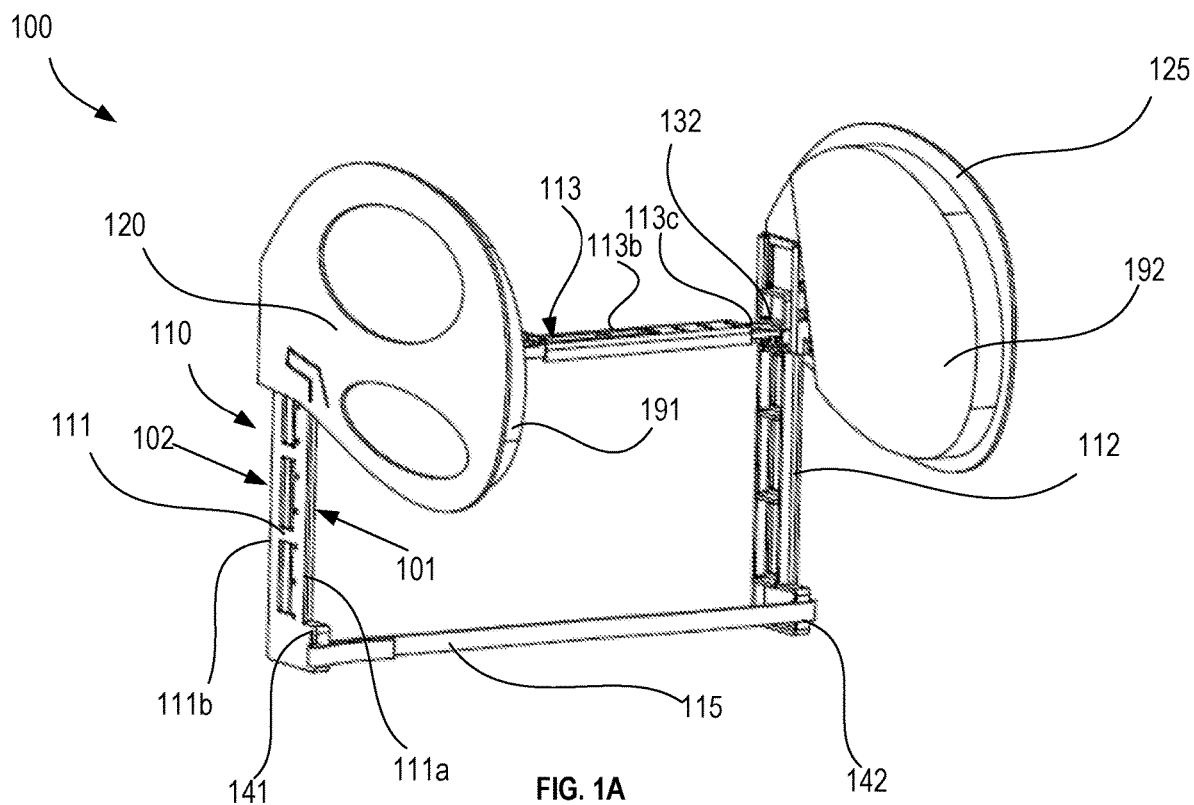
FIG. 1A shows a left perspective view of an exemplary portable privacy shield in an open or deployed state with both privacy shields attached in one of several vertical positions.

Referring to the left perspective view shown in FIG. 1A, the privacy apparatus 100 includes a frame 110 having a left vertical support 111, a right vertical support 112, and a first connecting member 113. The first connecting member 113 extends between the left and right vertical supports 111, 112. The first connecting member 113 is connected to left and right vertical supports 111, 112 by a first left support connection feature and a first right connection feature, such as a first support connection feature 132. The first connection member 113 enables the apparatus to rest on the top of the backrest of passenger seat. In some optional embodiments, the first connecting member 113 is configured to maintain the left and right vertical supports 111, 112 a fixed distance from one another.

The connection features may include one or more complementary features that provide a secure connection between the first connecting member 113 and vertical supports 111, 112. In various exemplary embodiments, the connection features may include one or more snap-fits, tongue and groove, pin and hole, hooks, magnets, adhesive, etc.

The left and right vertical supports 111, 112 have first sides 111a, 112a and second sides 111b, 112b opposite the first sides 111a, 112a of the left and right vertical supports 111, 112, respectively. The first side 111a of the left vertical support 111 and the first side 112a of the right vertical support 112 define a front side 101 of the frame 110, and the second side 111b of the left vertical support 111 and the second side 112b of the right vertical support 112 define a back side 102 of the frame 110. In some embodiments, the first sides 111a, 112a may be characterized as sides/faces or front portions of the left and right vertical supports 111, 112 that are substantially parallel (e.g., parallel or otherwise within 10° of exactly parallel) with the first connecting member 113 (e.g., or a longitudinal axis extending along the first connecting member 113 between the left and right vertical supports 111, 112. In an example embodiment, the left and right vertical supports 111, 112, have a generally rectangular cross-section, and the first and second sides 111a, 111b, 112a, 112b, are generally planar. The first sides 111a, 112a are substantially parallel with the first connecting member 113. In various embodiments, the left and right vertical supports 111, 112, may have other cross-sectional shapes, such as a generally cylindrical shape. The first sides 111a, 112a may be front portions of the left and right vertical supports 111, 112 that are substantially parallel with the first connecting member 113. In various exemplary embodiments, the left and right vertical supports 111, 112, may be linear and extend generally vertically when privacy apparatus 100 is in use. In some exemplary embodiments, left and right vertical supports 111, 112, may be non-linear and/or be positioned at an orientation angled relative to gravity when in use.

One or more panels may be at least partially supported by the left and/or right vertical supports 111, 112. In an exemplary embodiment, a first shield panel 120, such as a divider shield panel 120, is connected to the left vertical support 111, and a second shield panel 125 is connected to the right vertical support 112. The first and/or second shield panels 120, 125 may be configured to provide privacy and/or a side bearing surface for support of a seated passengers head, neck, etc. The first and/or second shield panels 120, 125 can provide privacy and/or comfort to a user by providing a barrier from the environment beyond the user's seat, such as a neighboring passenger. The first and/or second shield panels 120, 125 may provide a visual shield, such as partially blocking the user's angle of view and/or a view of the user by surrounding persons. Alternatively or additionally, the first and/or second panels 120, 125 may provide a barrier from bodily fluids from, e.g., sneezing or coughing, sound, light, and the like. In some embodiments, the first and/or second panels 120, 125 may provide a physical support for the user, and may include one or more cushions 191, 192. The cushions 191, 192 may provide a soft or conformable surface that enhances the comfort to a user. For example, a user may rest a portion of the user's body on one or both shield panels. The optional cushion can provide a padded surface for the portion of the user's body resting on the shield panel.

In some embodiments, the shield apparatus 100 includes a second connecting member 115 extending between the left and right vertical supports 111, 112. The second connecting member 115 is connected to left vertical support 111 by a second left support connection feature 141, and to right vertical support 112 by a second right support connection feature 142. The second connecting member 115 can be used to tighten the bottoms of vertical supports 111 and 112, or to otherwise provide structural support for the purpose of holding the privacy apparatus to a backrest of a passenger seat. For example, in use, the second connecting member 115 may be slightly in tension while the shield apparatus is held to a passenger seat. In some embodiments, the second connecting member 115 can be substantially parallel to the first connecting member. In various exemplary embodiments, shield apparatus 100 may include only first connecting member 113 (e.g., such that no other connecting member extends between left and right vertical supports 111, 112), shield apparatus 100 may include only second connecting member 115 (e.g., such that no other connecting member extends between left and right vertical supports 111, 112), both first connecting member 113 and second connecting member 115, and/or one or more connecting members in addition to first and second connecting members 113, 115. In some embodiments, the first connecting member 113 is configured to extend across a top of a passenger seat backrest, the second connecting member 115 is configured to extend across a front of a passenger seat backrest (e.g., between the front of the backrest and the user), and no connecting member extends around the back of the backrest. The shield apparatus 100 may avoid interference with a video screen, seat back tray, or the back of the backrest that may include one or more features configured for use by a passenger sitting in a seat behind the user of shield apparatus 100.

In an exemplary embodiment, first connecting member 113 has a different construction than second connecting member 115. For example, first connecting member 113 may be made of a substantially rigid material, such as a molded plastic (e.g., injection-molded plastic), aluminum, etc., and/or may resist compression such that the left and right vertical supports 111, 112 are maintained a fixed distance apart from one another by first connecting member 113. Second connecting member 115 may be made of a material that is less rigid and more flexible as compared to the material of the first connecting member 113, such as an elastic strap, fabric, flexible polymer, etc. In an exemplary embodiment, second connecting member 115 is an elastic strap that includes a fastener (e.g., snaps, clips, hook-and-loop, etc.) at one or both ends. The second connecting member may be passed through one or more loops or other features of shield apparatus 100 and secured to itself. In some embodiments, the second connecting member 115 is at least partially stretchable such that the second connecting member 115 may be maintained slightly in compression during use. Alternatively or additionally, such materials may promote patient comfort and reduce pressure points when the second connecting member 115 extends between the passenger seat and the user.

In an example embodiment, first connecting member 113 is made of the same material as the vertical supports 111, 112. For example, the vertical supports 111, 112, the first connecting member 113, and/or other portions of frame 110 may be made of a molded plastic, aluminum, etc. Such materials may provide a rigid and durable frame that is relatively light-weight. In some embodiments, the weight of privacy apparatus 100 is less than 3 pounds, less than 2 pounds, less than 1 pounds, or between about 0.25 pounds and 1.25 pounds.

Figure 1B:
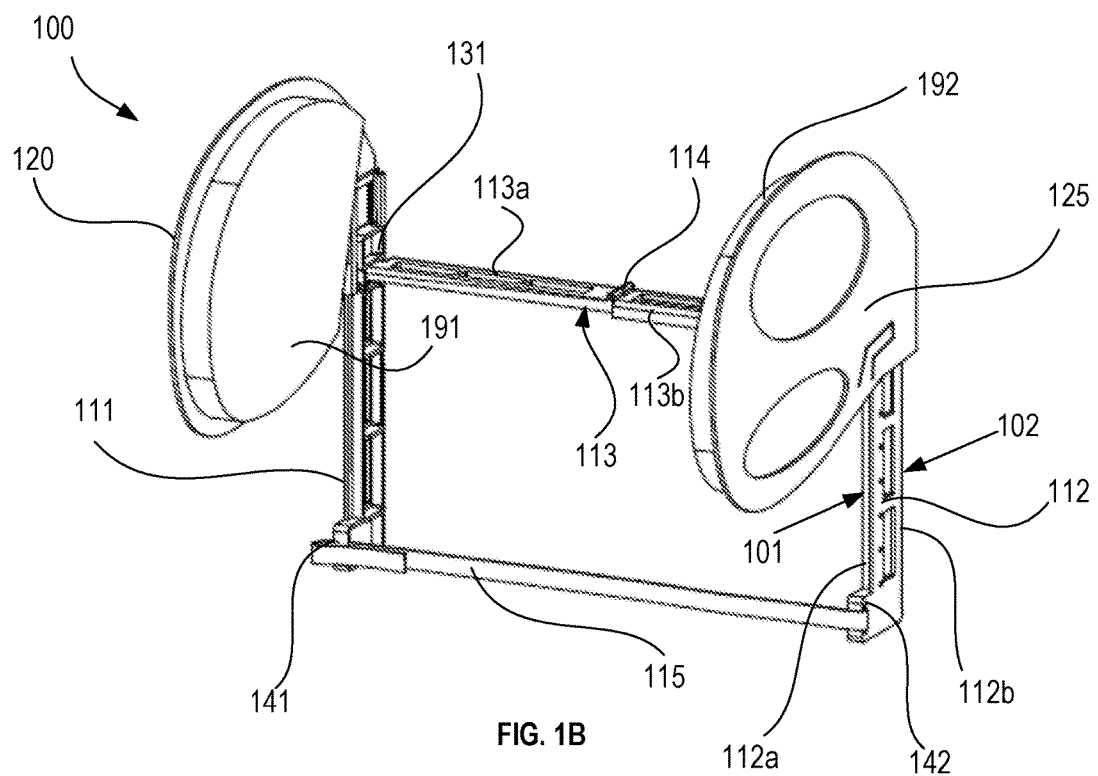
FIG. 1B shows a right perspective view of an exemplary portable privacy shield in an open or deployed state with both privacy shields attached in one of several vertical positions.

As further shown in the right perspective view in FIG. 1B, first connecting member 113 can, in some embodiments, include multiple portions that are removable or permanently attached to form first connecting member 113, such as a first connecting member portion and a second connecting member portion. For example, first connecting member 113 can include a left support 113a and right supports 113b and 113c attachable to one another at connection point 114. In some embodiments, connection point 114 can be, e.g., a hinge, pivot point, attachment surface/area, or the like that allows folding of first connecting member 113. A foldable connecting member 113 can facilitate collapsing of the frame 110 of the privacy apparatus and promote portability. First left support connection feature 131 and first right support connection feature 132 (shown in FIG. 1A) can include a rotating or pivoting connection to facilitate the collapsing of frame 110, such as a pivot or pin hinge. In some embodiments, second connecting member 115 can be similarly constructed with one or more portions pivotally or rotatably connected, and pivotal or rotatable connection at second left support connection feature 141 and second right support connection feature 142 (embodiment not shown).

Alternatively or additionally, left and right supports 113a, 113b, and 113c may be slidable relative to one another. For example, left support 113a may be at least partially slidable within a groove or flange of right support 113b. As another example, right support 113b may be at least partially slidable within a groove or flange of right support 113c. The first connecting member 113 may thus be adjustable in length in a telescoping manner. The left support 113a and right support 113b, or right supports 113b and 113c, may be slidable in a first direction (e.g., outwardly away from one another) to increase a length of first connecting member 113 and/or a distance between first and second shields 120, 125. In various example embodiments, one or more of the supports may include a snap, detente, lever, etc., that can be pushed, pulled, or otherwise manipulated (e.g., by a user's finger) so that the one or more supports may slide relative to one another.

Figure 1C:
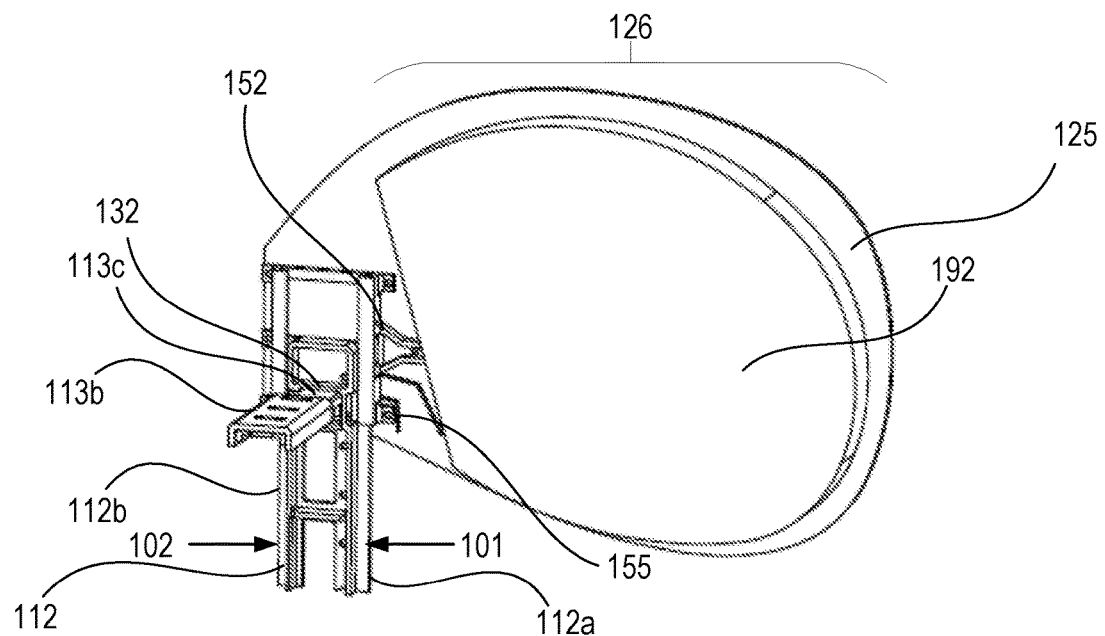
FIG. 1C shows a close-up perspective view of a portion of an exemplary portable privacy shield in an open or deployed state with a privacy shield attached.

FIG. 1C shows a close-up perspective partial view of the shield apparatus 100, including the second shield panel 125. Second shield panel 125 is configured to be vertically adjustable (e.g., to accommodate different height passengers, preferences, etc.). In an example embodiment, shield panel 125 is adjustable by pressing and holding feature 155, such as a press tab, sliding second shield panel 125 up or down vertical support 112 to a desired height, and releasing holding feature 155. First shield panel 120 may likewise be vertically adjustable, such as by a respective holding feature 155, facilitating movement up or down left vertical support 111. In various exemplary embodiments, holding feature 155 may be a press tab, snap-fit, detente, spring-loaded mechanism such as a spring-loaded pin or tab, frictional sliding engagement between complementary surfaces of the vertical supports and shield panels, and/or other holding features that facilitate movement and retention in one or more positions.

Second shield panel 125 can be attached to vertical support 112 by a right panel connection feature 152. First shield panel 120 can be similarly attached to left vertical support 111 by a left panel connection feature 151. First and second shield panels 120, 125 are attached to frame 110 such that a majority portion of the first and second panels (e.g., 126 for the second shield panel) extend in a direction outward and substantially perpendicularly from the front side 101 of the frame 110. For example, a majority (e.g., more than 75%, more than 85%, more than 95%) of the first and second panels extend outwardly in a direction away from the front side 101 of the frame 110. In use, the frame 110 is substantially behind a user and/or the first and second shield panels 120, 125 extend forwardly along each side of the user.

Right horizontal support 113c of first connecting member 113 is attached to right vertical support 112 at first right support connection feature 132. In an example embodiment, the connection between right vertical support 112 and first connecting member is removable, such that the components can be disassembled for portability. First right support connection feature 132 may include a press tab, snap-fit, detente, spring-loaded mechanism such as a spring-loaded pin or tab, frictional engagement, pin hinge, hook and groove, etc. In some embodiments, first right support connection feature 132 includes a pivot point configured to facilitate pivoting of first connecting member 113 relative to right vertical support 112 (e.g., from a substantially perpendicular relative orientation during use to a substantially parallel relative orientation when stowed).

Figure 2A:
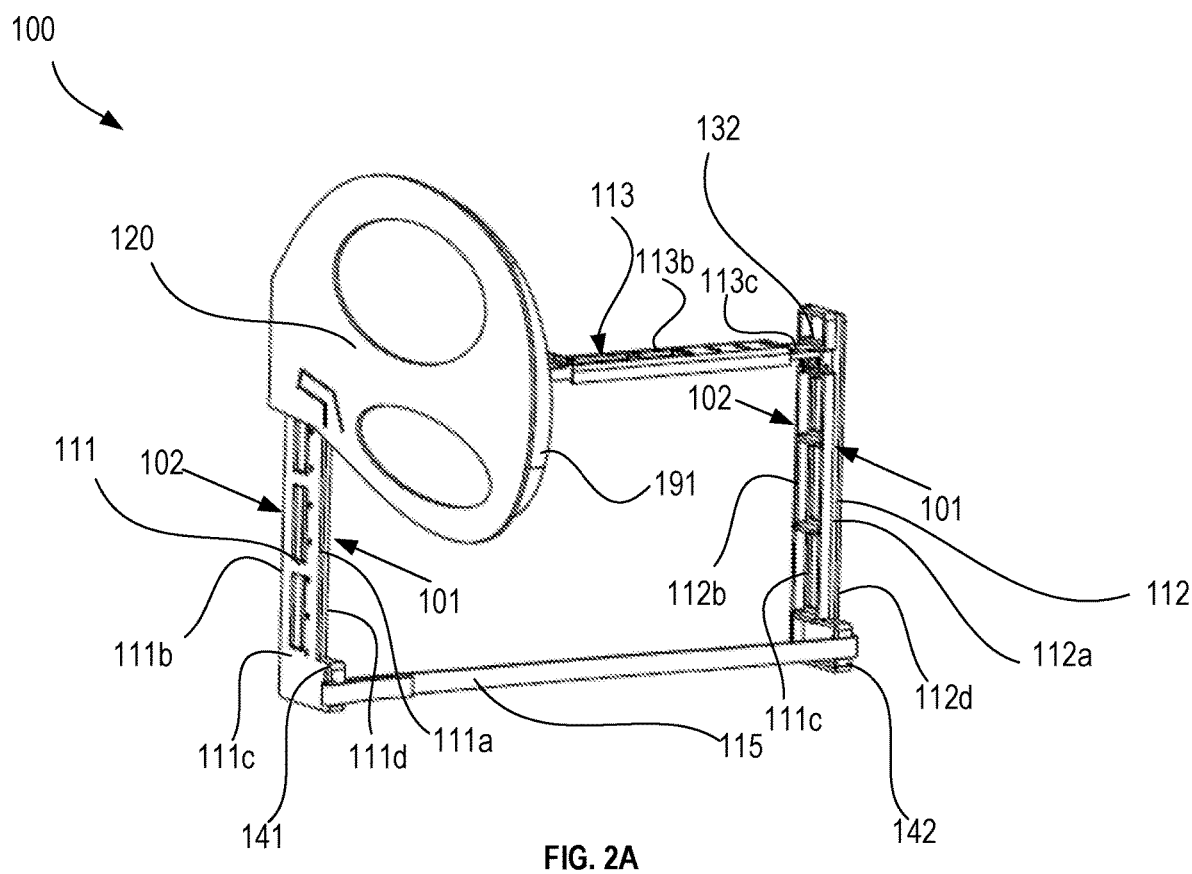
FIG. 2A shows a perspective view of an exemplary portable privacy shield in an open or deployed state with a configuration of the right privacy shield, or second shield panel, removed.

Referring now to FIG. 2A, the privacy apparatus 100 is shown with first shield panel 120 attached to left vertical support 111. The first shield panel 120 provides a privacy barrier on one side of a user or passenger (right side of passenger, from the passenger's perspective) while the other side of passenger is unobstructed. As further shown in FIG. 2A, left vertical support 111 can have a first side 111a, a second side 111b opposite the first side 111a, a third side 111c perpendicular to first side 111a and second side 111b, and a fourth side 111d perpendicular to first side 111a and second side 111b and opposite third side 111c. The right vertical support 112 can have a first side 112a, a second side 112b opposite the first side of the right vertical support, a third side 112c perpendicular to first side 112a and second side 112b, and a fourth side 112d perpendicular to first side 112a and second side 112b and opposite third side 112c. The first side 111a of the left vertical support 111 and the first side 112a of the right vertical support 112 define a front side 101 of the frame 110, and the second side 111b of the left vertical support 111 and the second side 112b of the right vertical support 112 define a back side 102 of the frame 110. Sides 111a-d and 112a-d are described for orientation purposes only. While the embodiment depicted shows left and right vertical supports 111 and 112 having generally rectangular shapes, the left and right vertical supports can have any shape, such as round or triangular. In such cases, sides 111a-d and 112a-d may be orthogonal sides, or portions of the surfaces of the vertical supports (e.g., quadrants of a circle for cylindrical supports) for purposes of describing the relative locations of various features on the frame.

Figure 2B:
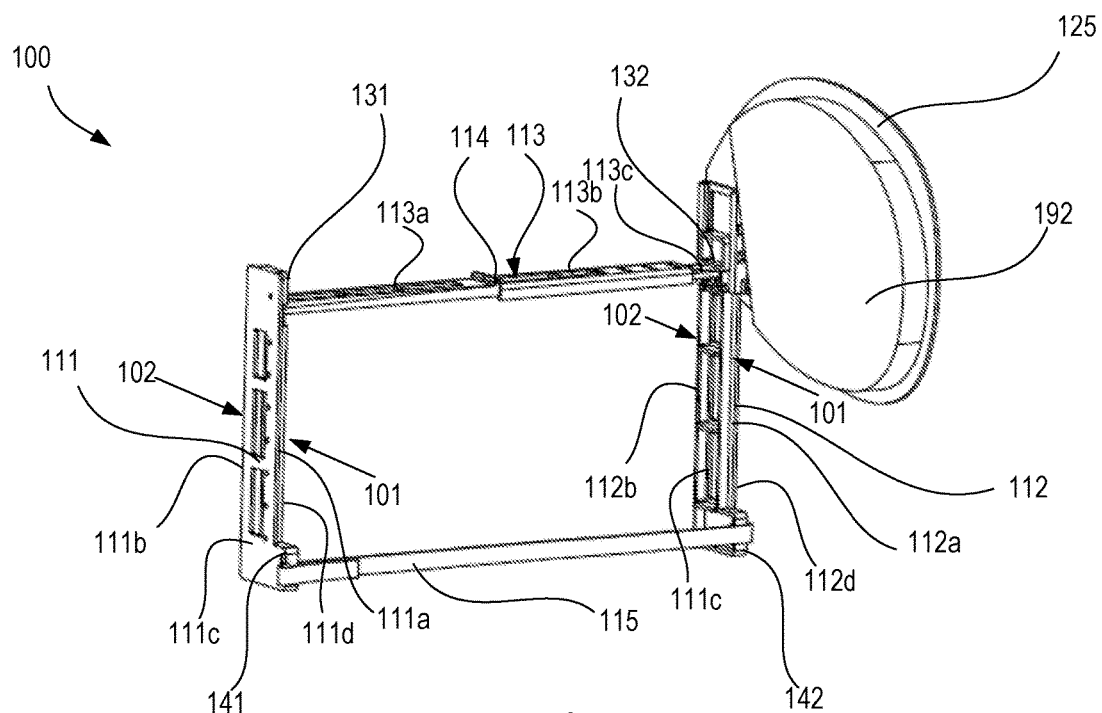
FIG. 2B shows a perspective view of an exemplary portable privacy shield in an open or deployed state with the left privacy shield, or first shield panel, removed.

FIG. 2B shows the privacy apparatus 100 with second shield panel 125 attached to right vertical support 112 to create a privacy barrier on one side of a user or passenger (left side of passenger, from the passenger's perspective) while the other side of passenger is unobstructed.

Figure 2C:
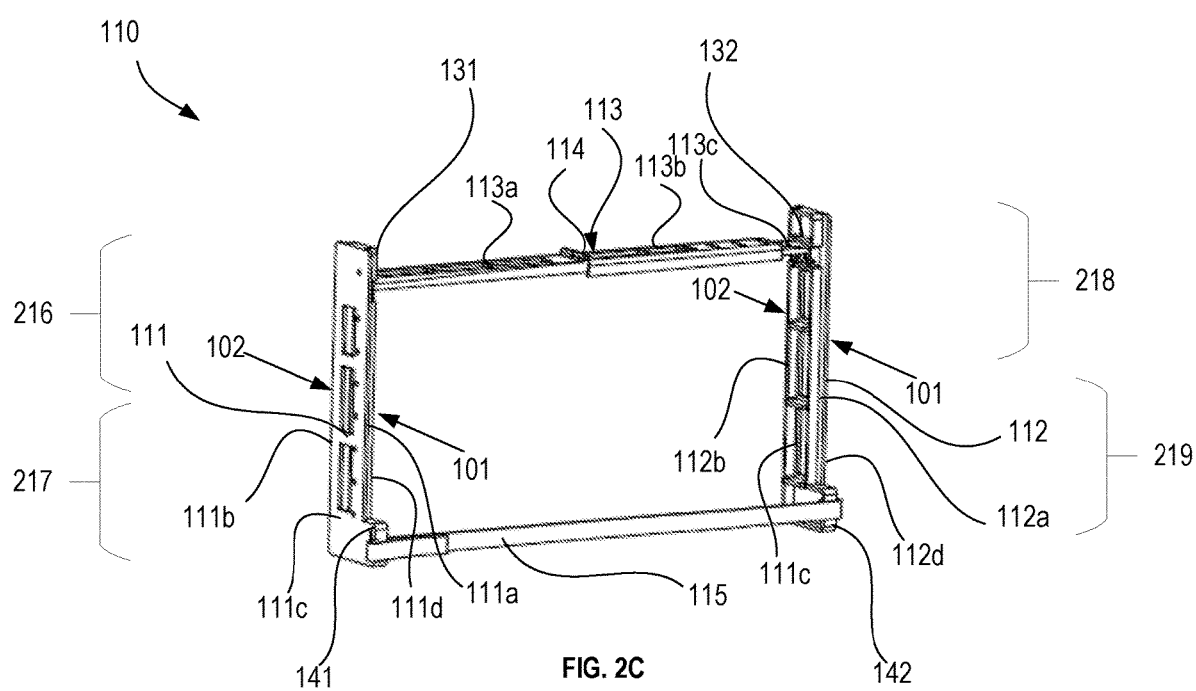
FIG. 2C shows an exemplary portable privacy shield in an open or deployed state with both right and left privacy shields, e.g., second and first shield panels, removed.

FIG. 2C shows the frame 110 of the privacy apparatus 100 with first shield panel 120 and second shield panel 125 (e.g., shown in FIG. 2A-2B) removed from left vertical support 111 and right vertical support 112 for, e.g., the purpose of no privacy or for an emergency situation where shield panels 120 and 125 can be removed upon request of a user, passenger, or other person, or as necessary or desired. As shown in further detail in FIG. 2C, first connecting member 113 is connected to left vertical support 111 by a first left support connection feature 131 within a top portion 216 of left vertical support 111. First connecting member 113 is connected to right vertical support 112 by a first right support connection feature 132 within a top portion 218 of right vertical support 112. Second connecting member 115 is connected to left vertical support 111 by a second left support connection feature 141 within a bottom portion 217 of left vertical support 111. Second connecting member 115 is connected to right vertical support 112 by a second right support connection feature 142 within a bottom portion 219 of right vertical support 112. In some embodiments, such as shown in FIG. 2C, the first connecting member is disposed between the first side 111a and second side 111b of the left vertical support 111 and between the first side 112a and second side 112b of the right vertical support 112. In some embodiments, such as shown in FIG. 2C, the second left support connection feature 141 is disposed on the first side 111a of the left vertical support 111 and the second right support connection feature 142 is disposed on the first side 112a of the right vertical support 112. In some embodiments, such as shown in FIG. 2C, the second left support connection feature 141 and the second right support connection feature 142 each extend in a direction outward and substantially perpendicularly from the front side 101 of the frame 110. In some embodiments, such as shown in FIG. 2C, the second connecting member 115 is disposed across the front side 101 of the frame 110. In some embodiments, the second connecting member 115, or an additional connecting member, is disposed across the back side 102 of the frame 110. In some embodiments, such as shown in FIG. 2C, there is no connecting member disposed across the back side 102 of the frame 110.

Figure 2D:
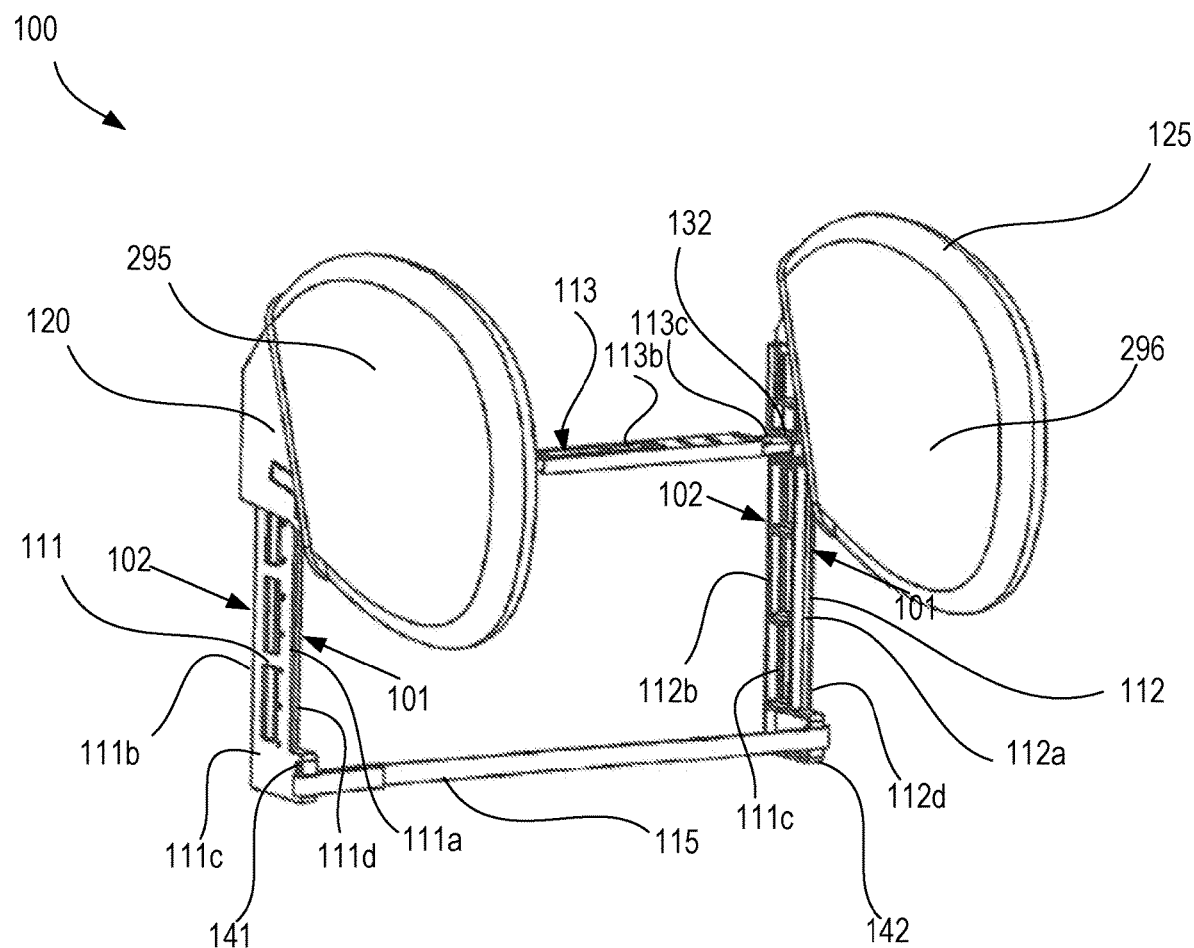
FIG. 2D shows an exemplary portable privacy shield in an open or deployed state with both privacy shields, or shield panels, attached and covers attached on both the right and left privacy shields.

FIG. 2D shows the shield apparatus 100 with optional removable covers 295 and 296 attached to shield panels 120 and 125, respectively, for additional comfort and/or hygiene. For example, removable covers 295 may be made of a washable material that be may repeatedly removed, washed, and replaced. Alternatively or additionally, removable covers 295 may be disposable covers that can be removed, disposed of, and replaced by a different cover. In some example embodiments, a disposable cover may include one or more features that prevent reuse.

In some example embodiments, a cushion and/or compressible material may be permanently or removable attached with the shield panels 120, 125. For example, the removable covers 295, 296 may include padding with a cushion or compressible material that promotes patient comfort when used as a head/neck rest and/or prevents contact by the user with hard or rigid components of shield apparatus 100.

Figure 3A:
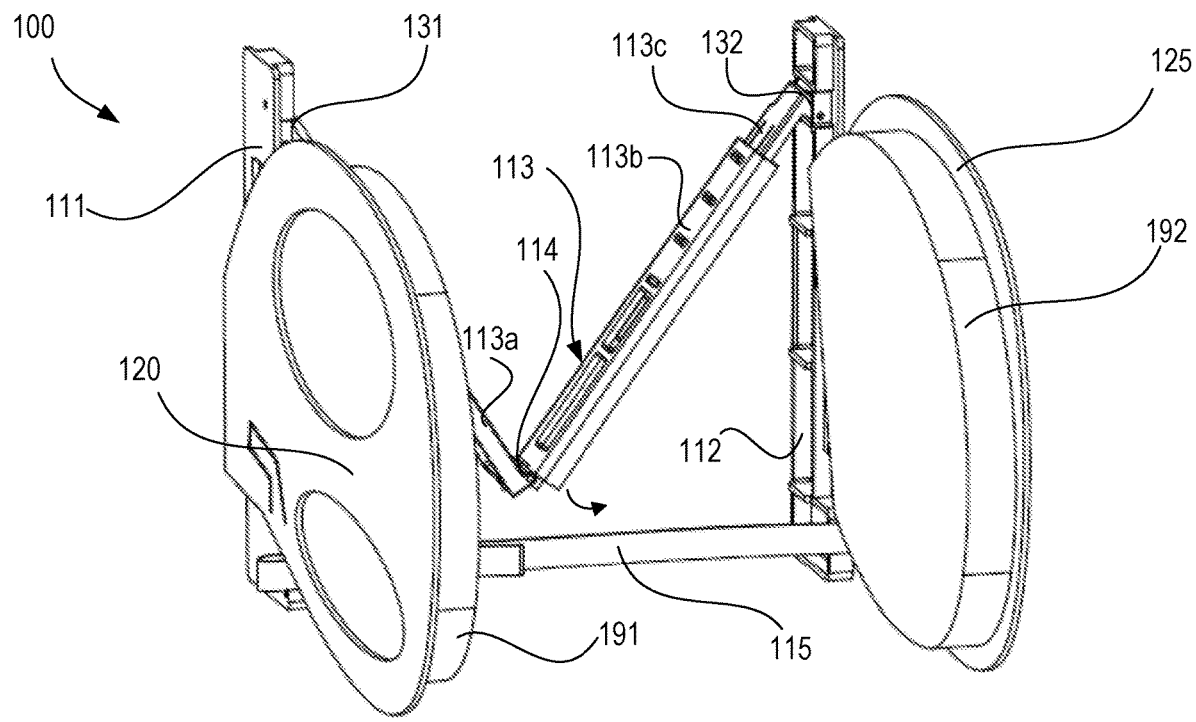
FIG. 3A shows an exemplary portable privacy shield in a partially collapsed or closed state.
Figure 3B:
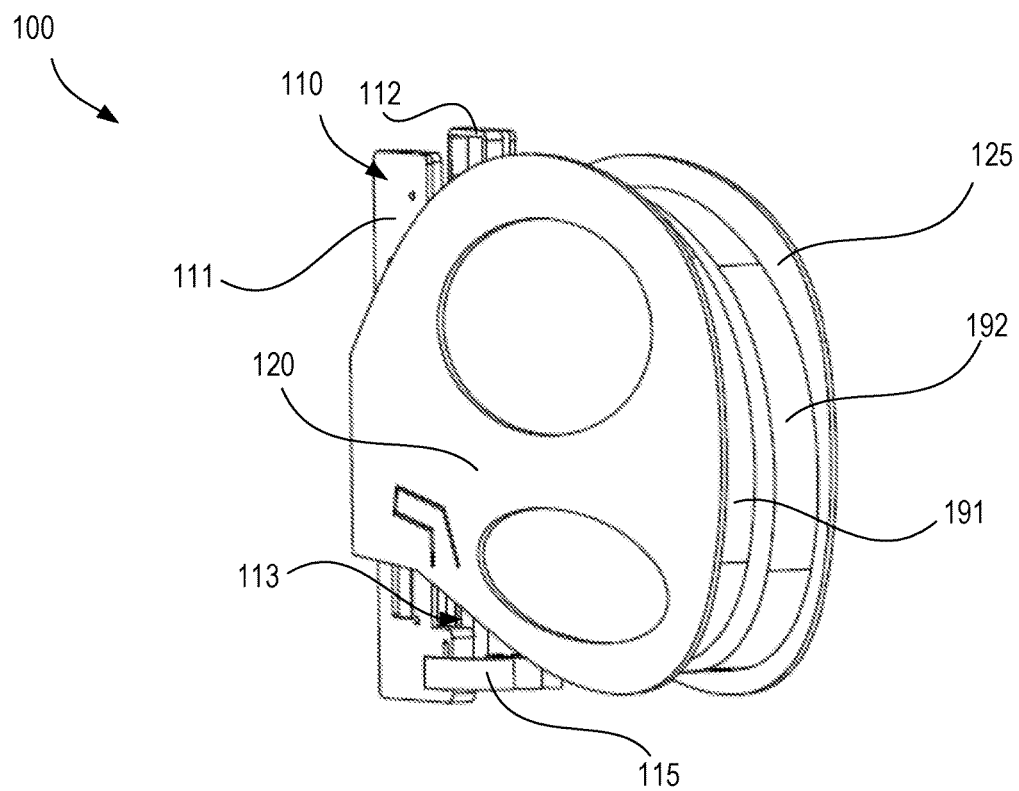
FIG. 3B shows an exemplary portable privacy shield in a fully collapsed state.
Figure 3C:
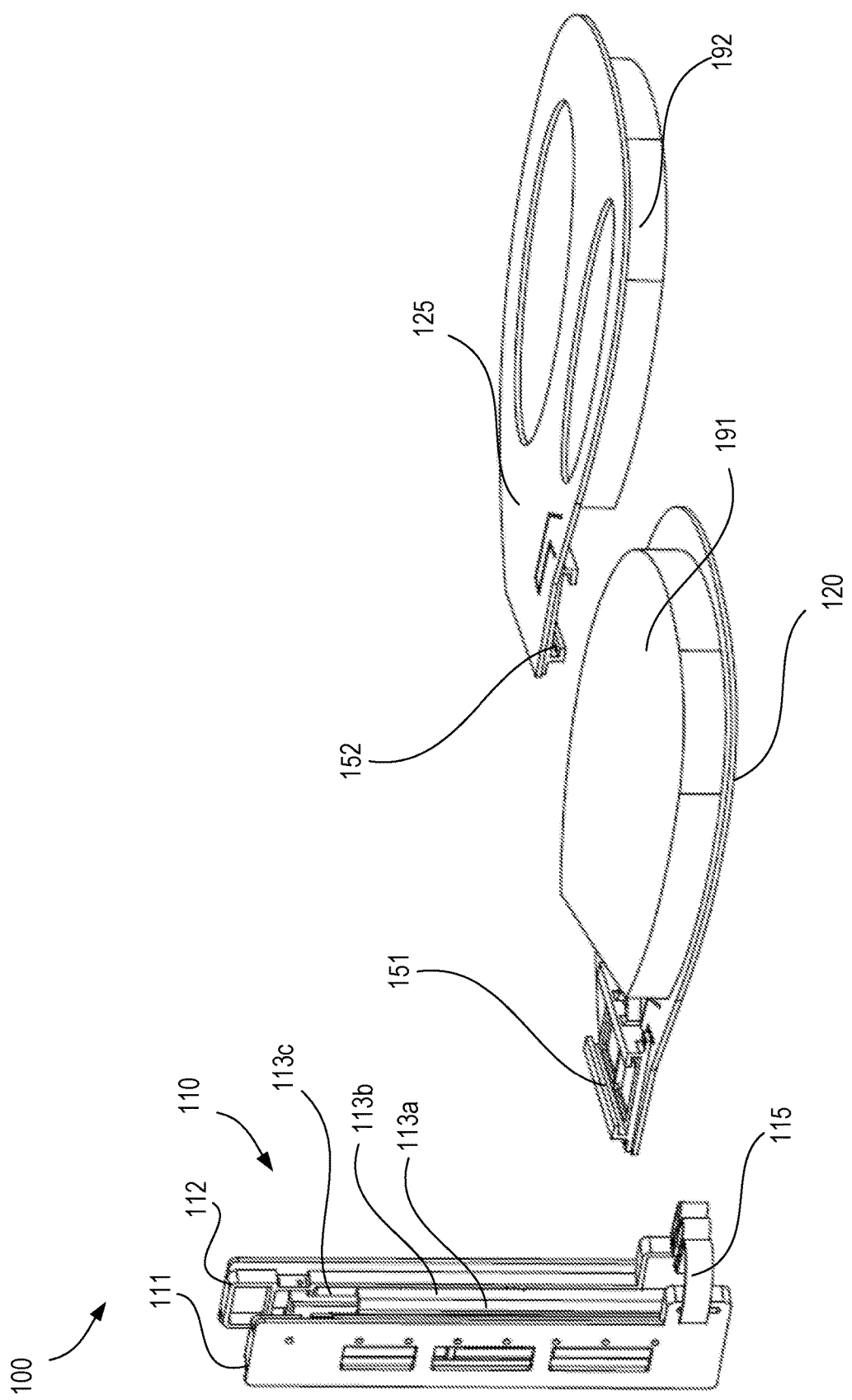
FIG. 3C shows an exemplary portable privacy shield with privacy shields removed and supports (e.g., frame) in a collapsed or closed state.

Referring to FIGS. 3A-3C, other exemplary configurations of the privacy apparatus 100 are shown, such as partially collapsed or fully collapsed configurations in which the privacy apparatus is collapsed to a smaller size and/or taken apart, such as for storage and/or increased portability.

FIG. 3A shows a collapsing or partially collapsed configuration of the privacy apparatus 100. In some embodiments, one or more components of frame 110 are moveable relative to one another to allow the privacy apparatus to collapse into a compact configuration. Frame 110 may include a first left support connection feature 131 and/or first right support connection feature 132 that facilitate first connecting member 113 pivoting or otherwise moving relative to left and right vertical supports 111, 112. Alternatively or additionally, first left support connection feature 131, first right support connection feature 132, and connection point 114 can pivot or rotate to enable the apparatus to collapse. In the depicted embodiment, left horizontal support 113a collapses downward at first left support connection feature 131 toward left vertical support 111. Right horizontal supports 113b and 113c collapse downward at first right support connection feature 132 toward right vertical support 112. Left horizontal support 113a and right horizontal support 113b are attached together at connection point 114, which allows pivoting or rotation to enable left horizontal support 113a and right horizontal support 113b to fold toward one another during collapse. In some embodiments, frame 110 may be collapsible while first connecting member 113 remains attached to both left and right supports 111, 112. In other exemplary embodiments, first connecting member 113 may be detached from left and/or right supports 111, 112, or may be separated (e.g., at connection point 114) such a portion of first connecting member 113 is attached to left vertical support 111 and a portion of first connecting member 113 is attached to right vertical support 112.

FIG. 3B shows the privacy apparatus 100 in a fully collapsed state, promoting the ability to store the portable privacy shield in a bag or similar traveling device for ease of transporting the privacy apparatus from one place to another. Second connecting member 115 can collapse in a manner compatible with the selected collapse method for first connecting member 113. For example, second connecting member 115 can be a flexible material that can fold to accommodate the collapse of the frame 110 as shown in FIG. 3B. Another exemplary configuration for the collapse of second connecting member 115 includes a configuration where second connecting member 115 is a rigid material having one or more pivot/fold points along its length. Another exemplary configuration for the collapse of second connecting member 115 includes using rotational connections at second left support connection feature 141 and/or second right support connection feature 142. In some exemplary embodiments, one of second support connection features 141, 142 can be removable while the other second support connection feature is rotatable. In some exemplary embodiments, a flexible connecting member, such as flexible connecting member 115 may be at least partially wrapped around one or more components of privacy apparatus 100 to retain privacy apparatus in the collapsed state.

As shown in FIG. 3B, shield panels 120, 125 can remain connected with collapsed frame 110 for storage. In an exemplary embodiment, the overall dimensions of the privacy apparatus 100 in the collapsed state are similar to dimensions of shield panels 120, 125. For example, an overall height of the privacy apparatus 100 in the collapsed state (e.g., in a direction parallel with left and/or right supports 111, 112) is similar to the height of the shield panels 120, 125, such as less than 25%, less than 15%, or less than 10% greater than the height of the shield panels 120, 125. Alternatively or additionally, a thickness of the privacy apparatus 100 in the collapsed state may be about the same as the thickness of the shield panels 120, 125. For example, the thickness of the privacy apparatus 100 in the collapsed state may be about double the thickness of a single shield panel 120, 125, and in some embodiments, may be between about 1" and 6", 2" and 3", or about 2.5".

FIG. 3C shows another exemplary configuration for storage of the collapsed privacy apparatus 100 in which shield panels 120, 125 are removed from vertical supports 111 and 112 of the frame 110 (e.g., so that the parts can be stored separately). Separated shield panels 120, 125 can promote flexibility in storing and transporting the privacy apparatus 100, and/or may facilitate manufacturing and assembly of privacy apparatus 100.

Figure 4A:
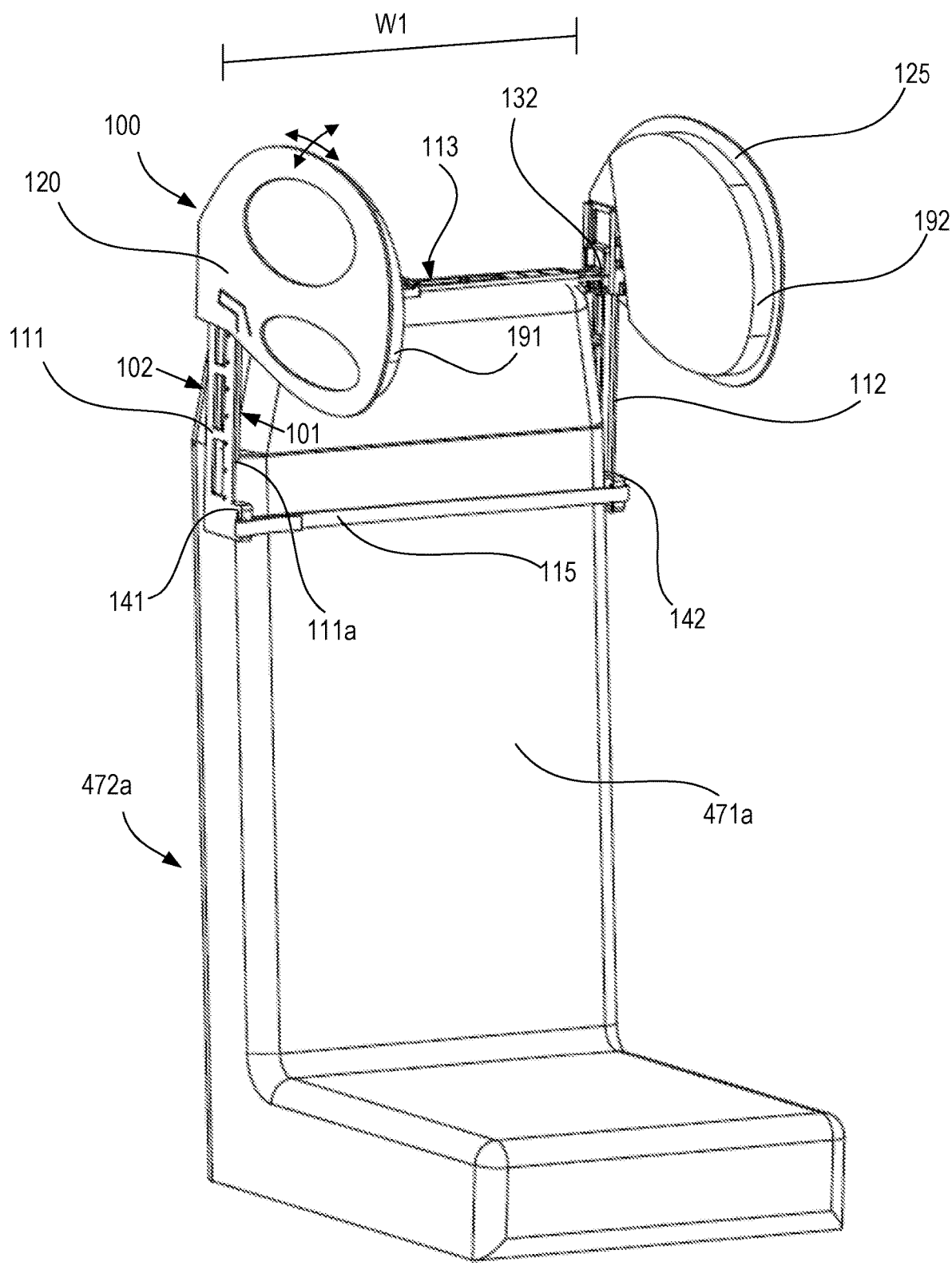
FIG. 4A shows an exemplary portable privacy shield with both right and left privacy shields (e.g., first and second shield panels) attached in an exemplary embodiment in which the exemplary portable privacy shield is attached to a backrest or backrest of a passenger vehicle seat.
Figure 4B:
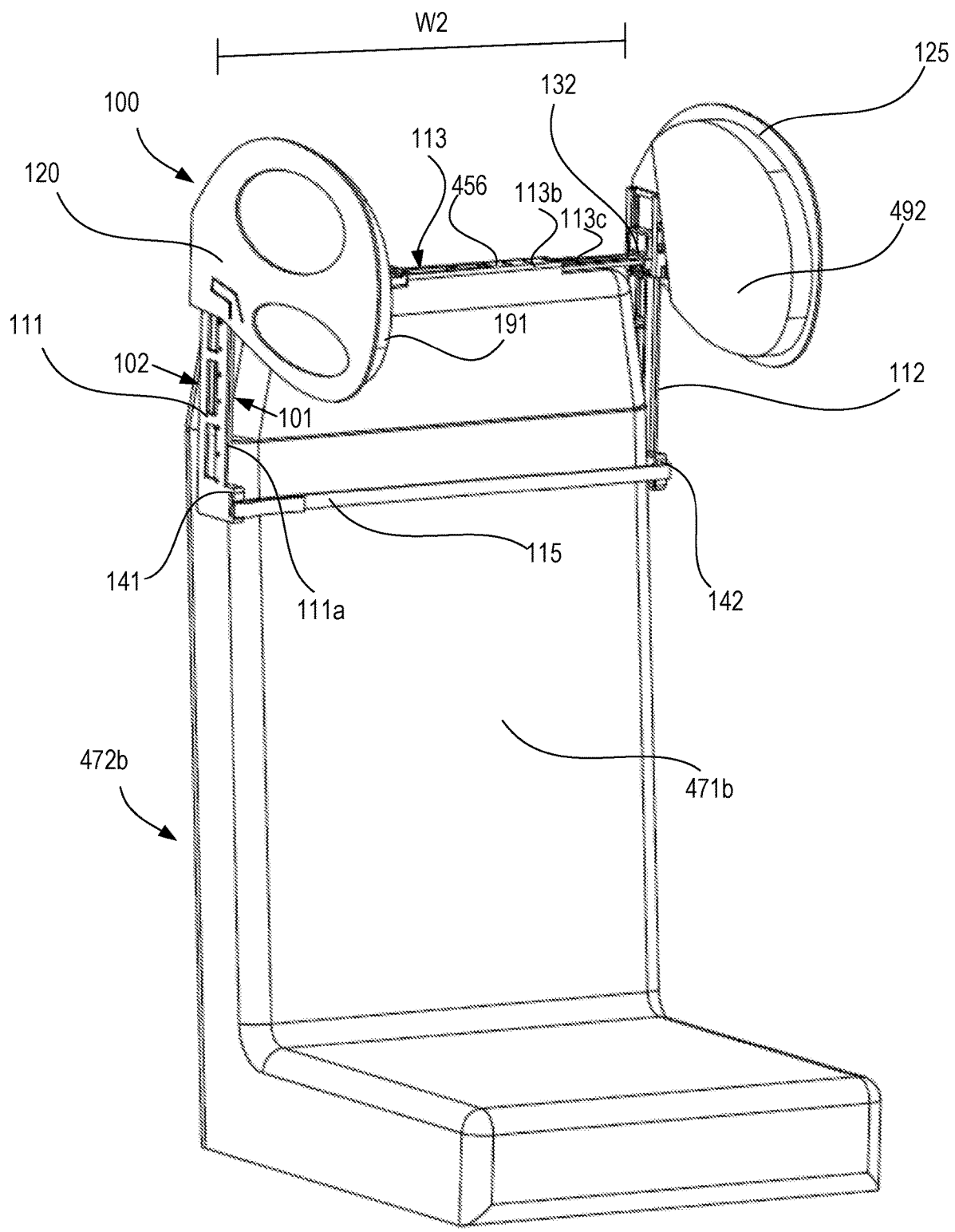
FIG. 4B shows the exemplary portable privacy shield of FIG. 4A with both right and left privacy shields (e.g., first and second shield panels) attached in another exemplary embodiment attached to a backrest or backrest of a passenger vehicle seat that has a backrest that is wider than the backrest in FIG. 4A.

Referring now to FIGS. 4A-4B, an exemplary implementation of the privacy apparatus 100 is shown in use attached to a backrest of a passenger seat. Passenger seat 472a may be a seat on a commercial airline, passenger vehicle such as a bus or train, or other seat configured for supporting a seated user. To position the privacy apparatus on the passenger seat 472a, the vertical supports 111 and 112 are placed on each side of the backrest 471a of the seat 472a and allowed to slide down until first connecting member 113 contacts the top of the backrest 471a of seat 472a. Second connecting member 115, e.g., a strap, can then be tightened to secure the privacy apparatus 100 to backrest 471a of seat 472a. In the configuration shown in FIG. 4A, first connecting member 113 may be in contact with a top of passenger seat 472a, and second connecting member may extend across a front of passenger seat 472a. Second connecting member 115 may be at least partially in tension, squeezing left and right vertical supports 111, 112, against the sides of passenger seat 472a.

Backrest 471a of seat 472a has a width W1. First and/or second connecting members 113, 115 can adjust in length to accommodate the width W1 of backrest 471a. In various exemplary embodiments, a distance between the left and right vertical supports 111, 112 may be adjusted between 12" and 36," between 16" and 24," or between 18" and 21," for example. Alternatively or additionally, shield panels 120 and 125 can be adjusted individually, up and down and/or rotationally side to side to a preferred height and/or position, or removed by the user or passenger as described herein.

FIG. 4B shows the privacy apparatus 100 on a passenger seat 472b having a width W2, different than width W1. The privacy apparatus 100 can be adjusted to accommodate different width W2 of backrest 471b. For example, first connecting member 113 may include a telescoping feature For example, pressing down by a user on right horizontal support 113b adjusting feature 456 (such as a knob, press button, tab, etc.) allows for sliding telescoping right horizontal support 113c in or out of right horizontal support 113b to achieve a selected width of the privacy apparatus 100 compatible with passenger seat 472b. The privacy apparatus 100 can be attached to passenger seat 472b backrest 471b in the same manner as described with respect to FIG. 4A, for example. Second connecting member 115 can also be adjustable to accommodate differing widths of backrests. Exemplary adjustable configurations for second connecting member 115 include, but are not limited to, a telescoping member, elastic material that allows for stretching, an adjustment feature on a strap allowing for shortening or lengthening of the strap as needed, and the like.

Figure 5A:
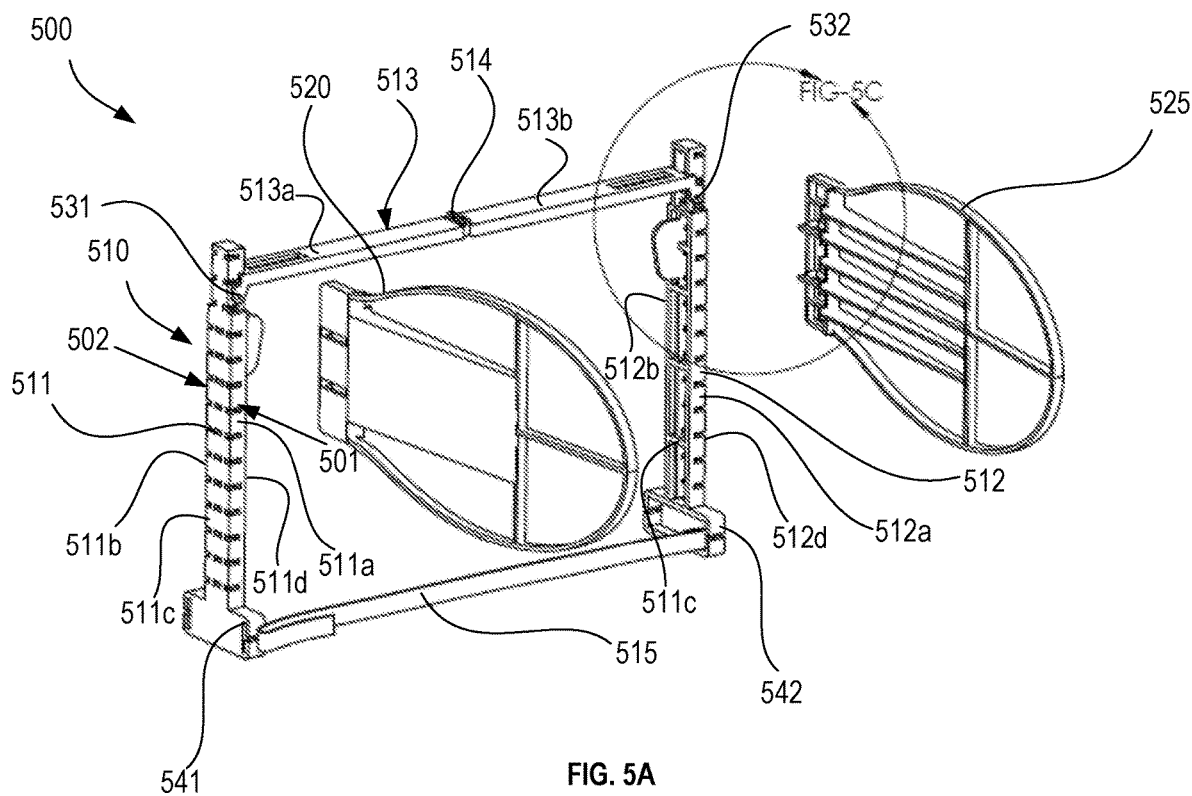
FIG. 5A shows an exploded left perspective view of an exemplary portable privacy shield.
Figure 5C:
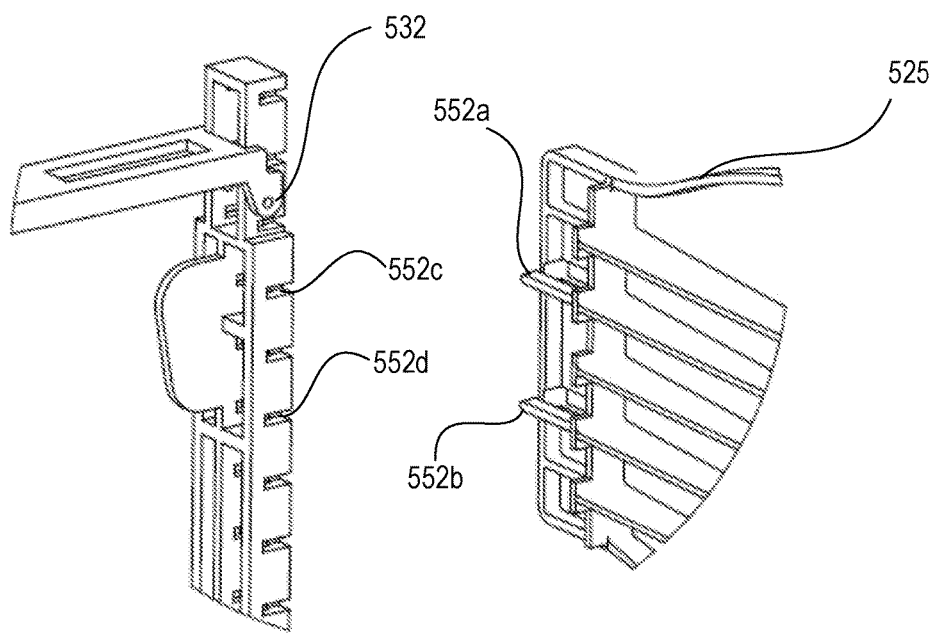
FIG. 5C shows a close-up perspective view of a portion of the portable privacy shield of FIG. 5A.
Figure 5B:
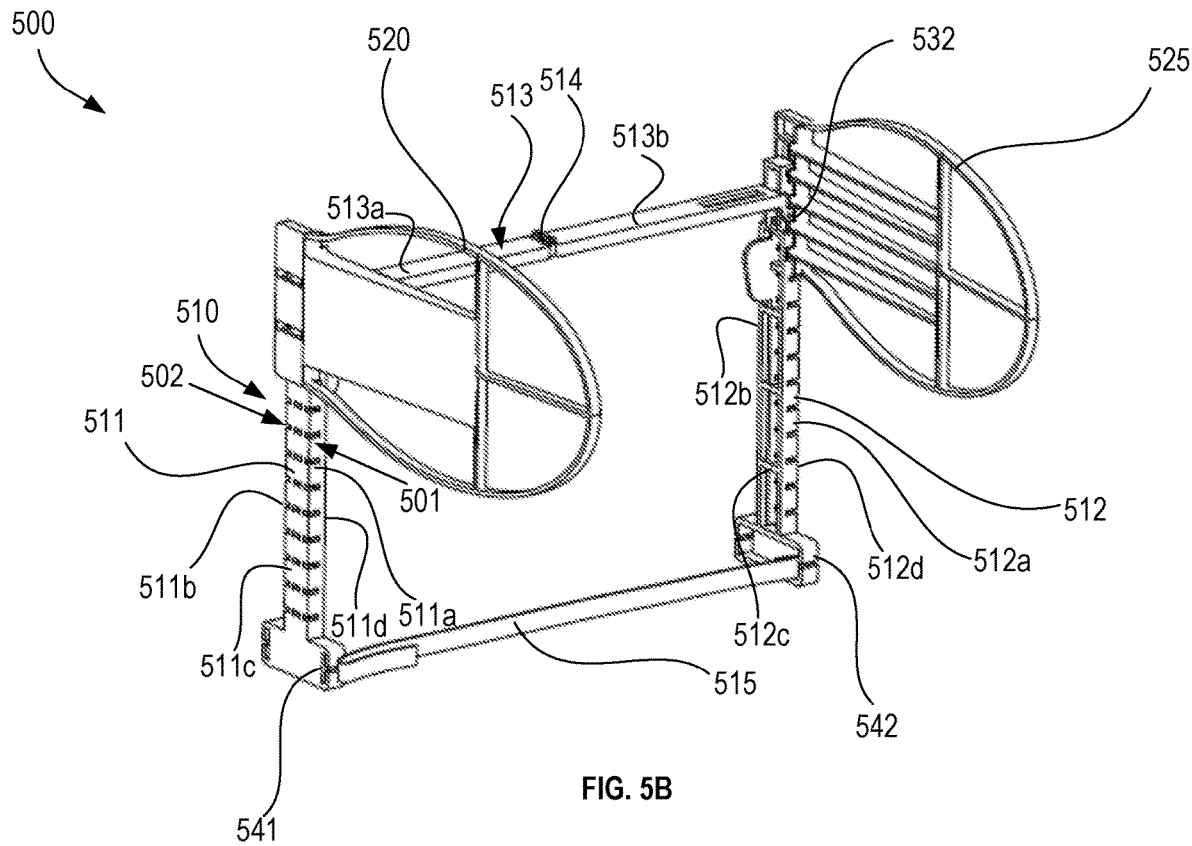
FIG. 5B shows a left perspective view of the exemplary portable privacy shield of FIG. 5A in an open or deployed state with both privacy shields attached in one of several vertical positions.

Referring now to FIGS. 5A-5C, another exemplary embodiment of a privacy apparatus is shown. As shown in FIG. 5A, the privacy apparatus 500 of FIGS. 5A-5C includes shield panels 520, 525 attachable to frame 510 to provide privacy and a side bearing surface for support of a seated passengers head. In various exemplary embodiments, privacy apparatus 500 may include one or more features as described herein with reference to privacy apparatus 100, for example.

Privacy apparatus 500 includes a frame 510 having a left vertical support 511, a right vertical support 512, and a first connecting member 513. The first connecting member 513 extends between the left and right vertical supports 511, 512. The first connecting member 513 is connected to left vertical support 511 by a first left support connection feature 531, and to right vertical support 512 by a first right support connection feature 532, and enables the apparatus to rest on the top of the backrest of a passenger seat. In some embodiments, first connecting member 513 includes a left horizontal support 513a and right horizontal support 513b attached at connection point 514. For example, connection point 514 can be a hinge, pivot point, or the like that allows folding of first connecting member 513 to allow collapsing of the frame 510 of the privacy apparatus for increased portability. The left vertical support 511 has a first side 511a and a second side 511b opposite the first side of the left vertical support. The right vertical support 512 has a first side 512a and a second side 512b opposite the first side of the right vertical support. The first side 511a of the left vertical support 511 and the first side 512a of the right vertical support 512 define a front side 501 of the frame 510, and the second side 511b of the left vertical support 511 and the second side 512b of the right vertical support 512 define a back side 502 of the frame 510. A first shield panel 520, such as a divider shield, is connected to the left vertical support 511, and a second shield panel 525 is connected to the right vertical support 512. As further shown in FIG. 5A, left vertical support 511 can have a first side 511a, a second side 511b opposite the first side of the left vertical support, a third side 511c perpendicular to first side 511a and second side 511b, and a fourth side 511d perpendicular to first side 511a and second side 511b and opposite third side 511c. The right vertical support 512 can have a first side 512a, a second side 512b opposite the first side of the right vertical support, a third side 512c perpendicular to first side 512a and second side 512b, and a fourth side 512d perpendicular to first side 512a and second side 512b and opposite third side 512c. The privacy apparatus 500 includes a second connecting member 515 extending between the left and right vertical supports 511, 512. The second connecting member 515 is connected to left vertical support 511 by a second left support connection feature 541, and to right vertical support 512 by a second right support connection feature 542. The second connecting member 515 can be used to tighten the bottoms of vertical supports 511 and 512, or to otherwise provide structural support for the purpose of holding the privacy apparatus to a backrest of a passenger seat. The height, or location of the shield panels 520 and 525 on the vertical supports 511, 512 is adjustable.

FIG. 5B illustrates the privacy apparatus 500 of FIG. 5A with shield panels 520, 525 connected to frame 510 at vertical supports 511, 512. Shield panels 520, 525 are shown positioned in FIG. 5B in the top most vertical position of the adjustability feature on both sides of frame 510.

FIG. 5C shows a detailed view of the portion of privacy apparatus 500 in which one or more complementary features interact to allow shield panels 520, 525 to be moved relative to left and right vertical supports 511, 512 between user-selected positions. In an exemplary embodiment, panel connection features 552 (e.g., left and right panel connection features) include position pin features 552a, 552b insertable into one or more mating features 552c, 552d (e.g., slots, receptacles, grooves, etc.) of right vertical support 512. Both pin features 552a, 552b and mating features 552c, 552d are used for vertical positioning of shield panel 525 on right vertical support 512. A similar construction and configuration can be used to connect shield panel 520 to left vertical support 511.

Figure 5D:
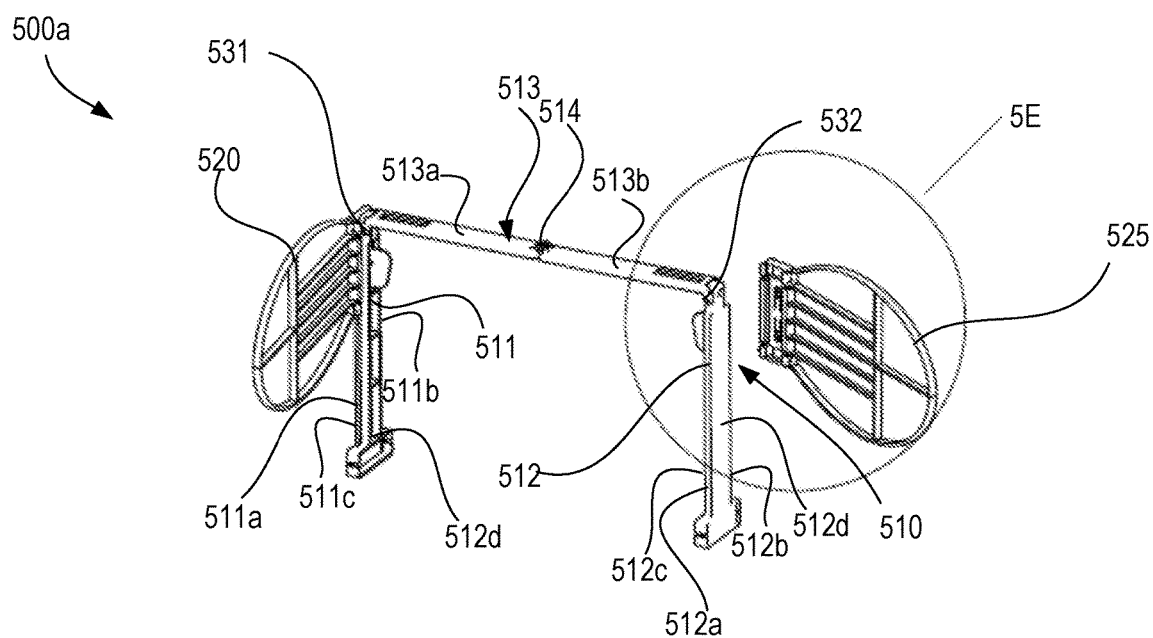
FIG. 5D shows a right perspective view of an exemplary portable privacy shield in an open or deployed state with an exploded view of the right side of the portable privacy shield.
Figure 5E:
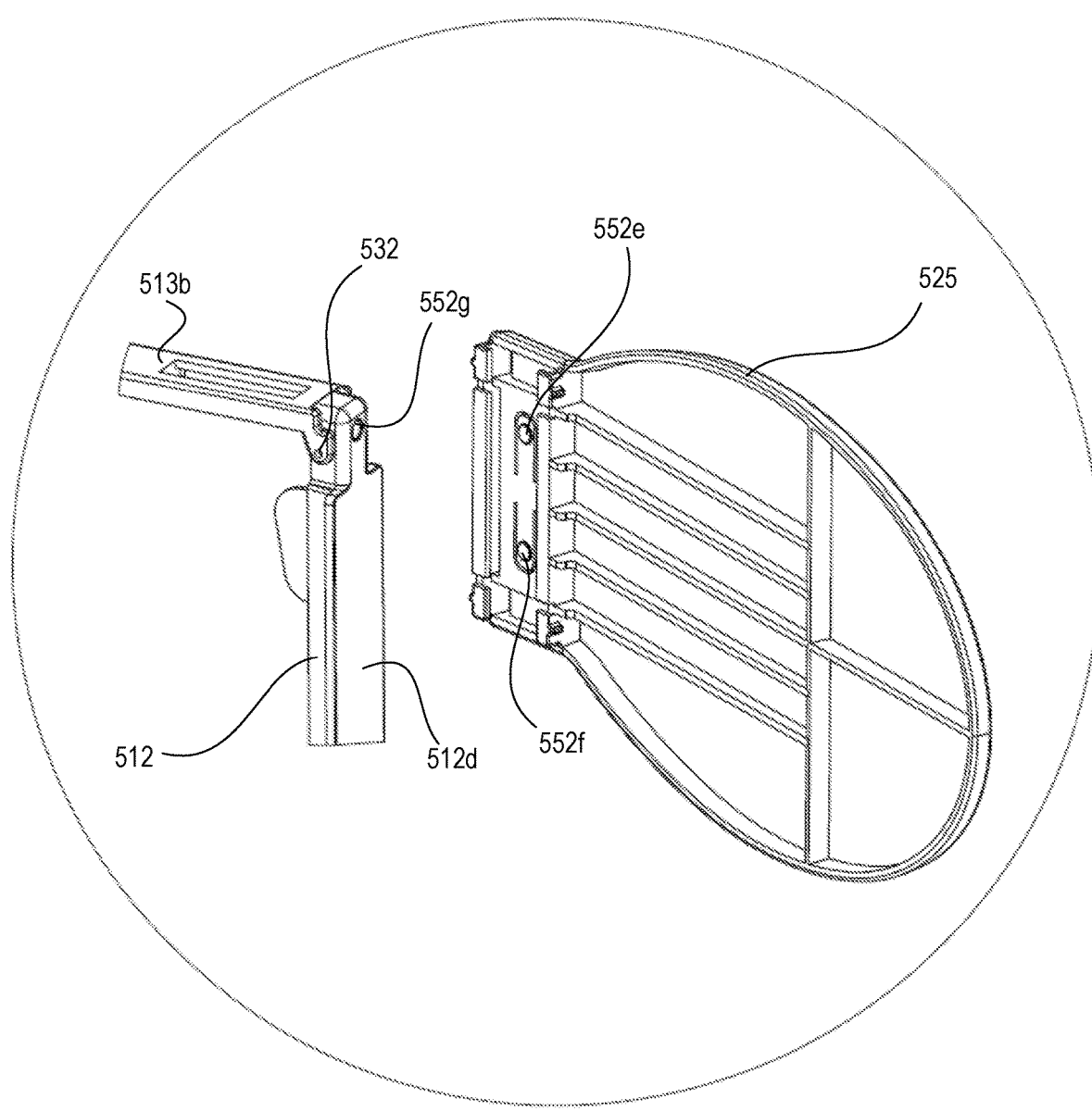
FIG. 5E shows a close-up perspective view of a portion of the portable privacy shield of FIG. 5D.

Referring to FIGS. 5D-5E exemplary privacy apparatus 500a is shown. The privacy apparatus 500a includes shield panels 520, 525 attachable to frame 510 to provide privacy and a side bearing surface for support of a seated passengers head.

Privacy apparatus 500 includes a frame 510 having a left vertical support 511, a right vertical support 512, and a first connecting member 513. The first connecting member 513 extends between the left and right vertical supports 511, 512. The first connecting member 513 is connected to left vertical support 511 by a first left support connection feature 531, and to right vertical support 512 by a first right support connection feature 532, and enables the apparatus to rest on the top of the backrest of passenger seat. First connecting member 513 can, in some embodiments, include a left horizontal support 513a and right horizontal support 513b are attached together at connection point 514. In some embodiments, connection point 514 can be, e.g., a hinge, pivot point, snap-fit, hole and pin or the like that allows folding of first connecting member 513 to allow collapsing of the frame 510 of the privacy apparatus for increased portability. The left vertical support 511 has a first side 511a and a second side 511b opposite the first side of the left vertical support. The right vertical support 512 has a first side 512a and a second side 512b opposite the first side of the right vertical support. The first side 511a of the left vertical support 511 and the first side 512a of the right vertical support 512 define a front side 501 of the frame 510, and the second side 511b of the left vertical support 511 and the second side 512b of the right vertical support 512 define a back side 502 of the frame 510. A first shield panel 520, such as a divider shield, is connected to the left vertical support 511, and a second shield panel 525 is connected to the right vertical support 512. As further shown in FIG. 5A, left vertical support 511 can have a first side 511a, a second side 511b opposite the first side of the left vertical support, a third side 511c perpendicular to first side 511a and second side 511b, and a fourth side 511d perpendicular to first side 511a and second side 511b and opposite third side 511c. The right vertical support 512 can have a first side 512a, a second side 512b opposite the first side of the right vertical support, a third side 512c perpendicular to first side 512a and second side 512b, and a fourth side 512d perpendicular to first side 512a and second side 512b and opposite third side 512c. The privacy apparatus 500a optionally does not include a second connecting member extending between the left and right vertical supports 511, 512. In such optional embodiments, first connecting member 513, along with vertical supports 511, 512 provide sufficient means for securing privacy apparatus 500a to a backrest of a passenger seat. The height, or location of the shield panels 520 and 525 on the vertical supports 511, 512 is adjustable. FIG. 5D depicts one shield panel, first shield panel 520 attached and in a deployed configuration, while the other shield panel, second shield panel 525, is shown detached for illustrative purposes regarding an alternate attachment embodiment, which is further illustrated in FIG. 5E.

FIG. 5E shows a detailed view of the portion of privacy apparatus 500 highlighted in FIG. 5D. Shield panel 525 can slide vertically on right vertical support 512. Right panel connection feature comprises one or more protruding features 552e, 552f which can create resistance on the surface of fourth side 512d of right vertical support 512, thus enabling shield panel 525 to stay in place at a desired height chosen by a user. Indented feature 552g (e.g., depression, through-hole, etc.) provides a vertical stop on right vertical support 512 such that when a user slides shield panel 525 vertically until protruding feature 552e contacts indented feature 552g, shield panel 525 will no longer be able to slide upward further. The feature 552g may thus provide a stop to prevent inadvertent removal of panel 525 from the frame, and/or provide feedback to the user that the upper most position for use has been reached. A similar construction and configuration can be used to connect shield panel 520 to left vertical support 511.

Referring now to FIGS. 6A-6E, an exemplary embodiment of a personal privacy apparatus that is worn on a user is shown.

Figure 6A:
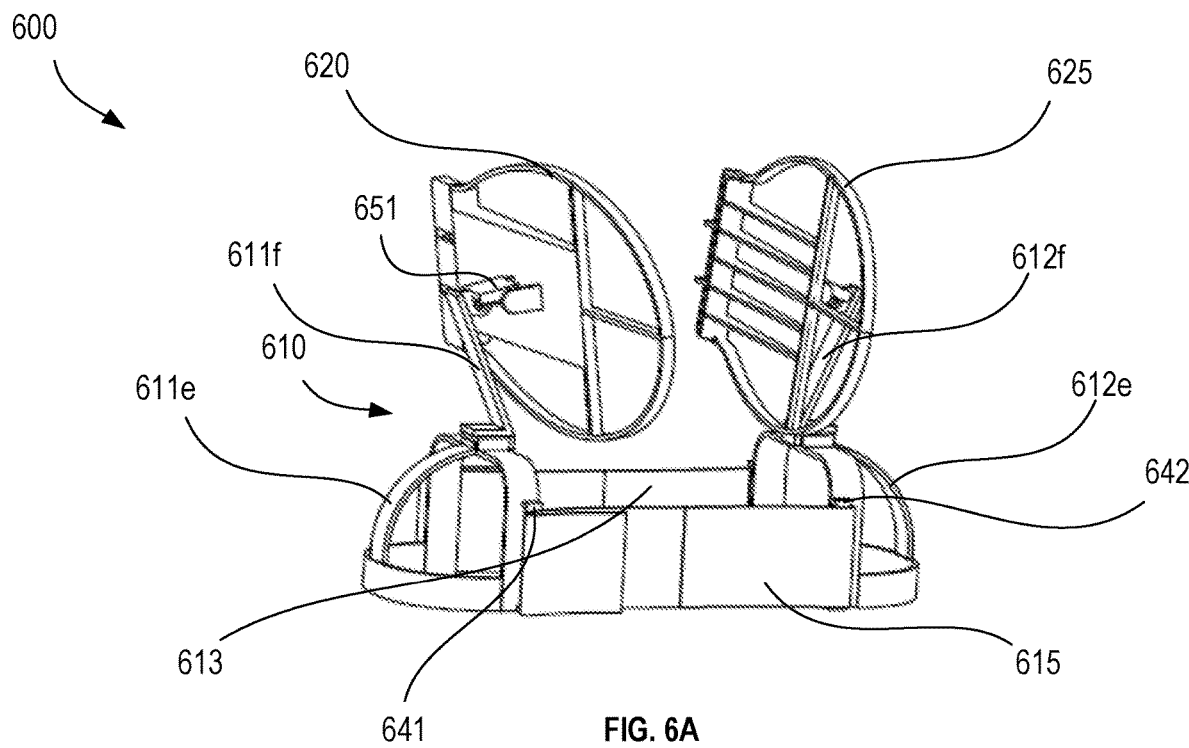
FIG. 6A shows a left perspective view of an exemplary personal portable privacy shield in an open or deployed state with both privacy shields attached in one of several positions.
Figure 6B:
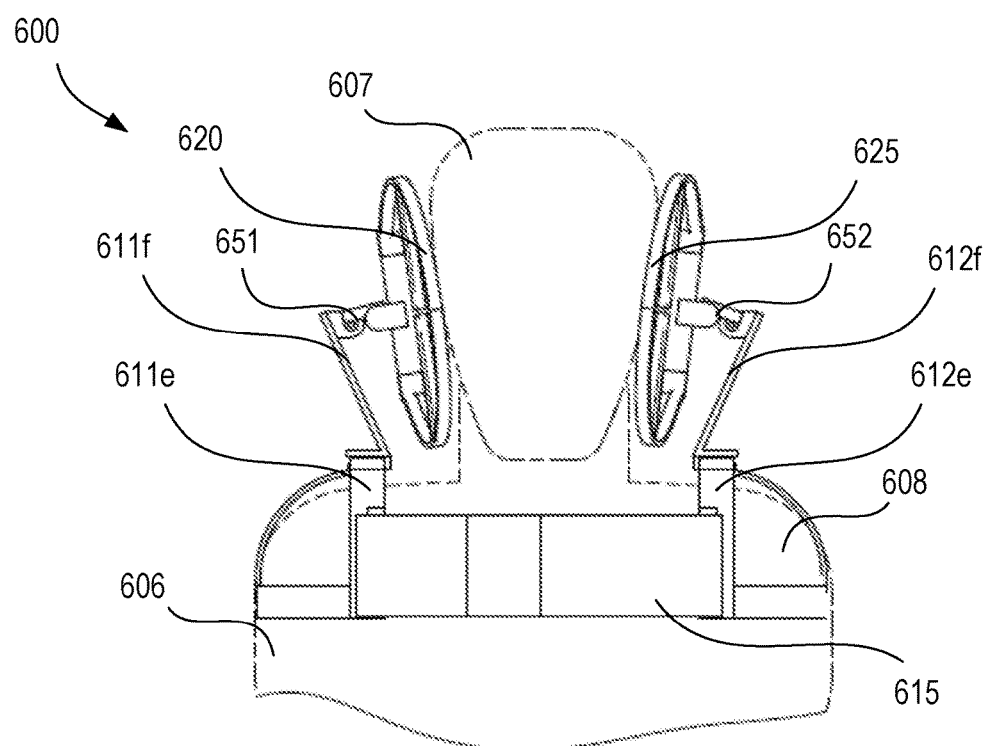
FIG. 6B shows a front view of an exemplary personal portable privacy shield in an open or deployed state with both privacy shields attached in one of several positions, as worn on a user.

FIG. 6A shows a perspective view of a fully assembly portable personal privacy apparatus 600. Privacy apparatus 600 includes a frame 610 that provides support for shield panels 620, 625 and/or supports privacy apparatus 600 on a user. For example, privacy apparatus 600 includes a left vertical support and a right vertical support configured to support the privacy apparatus 600 on a user's shoulders. In an exemplary embodiment, the left vertical support includes a left semi-spherical base frame 611e and a left vertical post 611f extending in a substantially vertical direction from a top portion of the left base frame 611e. Frame 610 further includes a right vertical support having a right semi-spherical base frame 612e and a right vertical post 612f extending in a substantially vertical direction from a top portion of the right base frame 612e. In some embodiments, vertical posts 611f, 612f are adjustable in a vertical direction to accommodate different neck heights or desired positions of a user 606. Connecting members 613 and 615 each individually extend between the left and right base frames 611e, 612e. The second connecting member 615 is connected to left vertical support 611 by a second left support connection feature 641, and to right vertical support 612 by a second right support connection feature 642. First connecting member 613 is similarly connected. First left support connection feature 651 connects shield panel 620 with left vertical post 611f. In some embodiments, left support connection feature 651 can include a rotating or pivoting connection to allow adjustment of shield panel 620 to desired angled positions for privacy or head and/or neck support. Shield panel 625 is similarly connected to right vertical post 612f.

The personal privacy apparatus 600 is used on a person's body (e.g., entirely supported on a user's body). As shown in the front perspective view of FIG. 6B, left and right base frames 611e, 612e are each configured to rest on a shoulder 608 of a user 606 (e.g., configured to independent rest on a should 608). Connecting member 613 is located on the back of the device and connecting member 615 is located on the front of the device. Connecting members 613, 615 are used to tighten and hold the apparatus to the body. For example, connection members 613, 615 may be slightly in tension when privacy apparatus 600 is in use supported on a user. Shield panels 620, 625 are positioned close to or against a user's 606 head 607 for support of side to side movement and/or privacy from adjacent persons, passengers, or other items or beings.

Figure 6C:
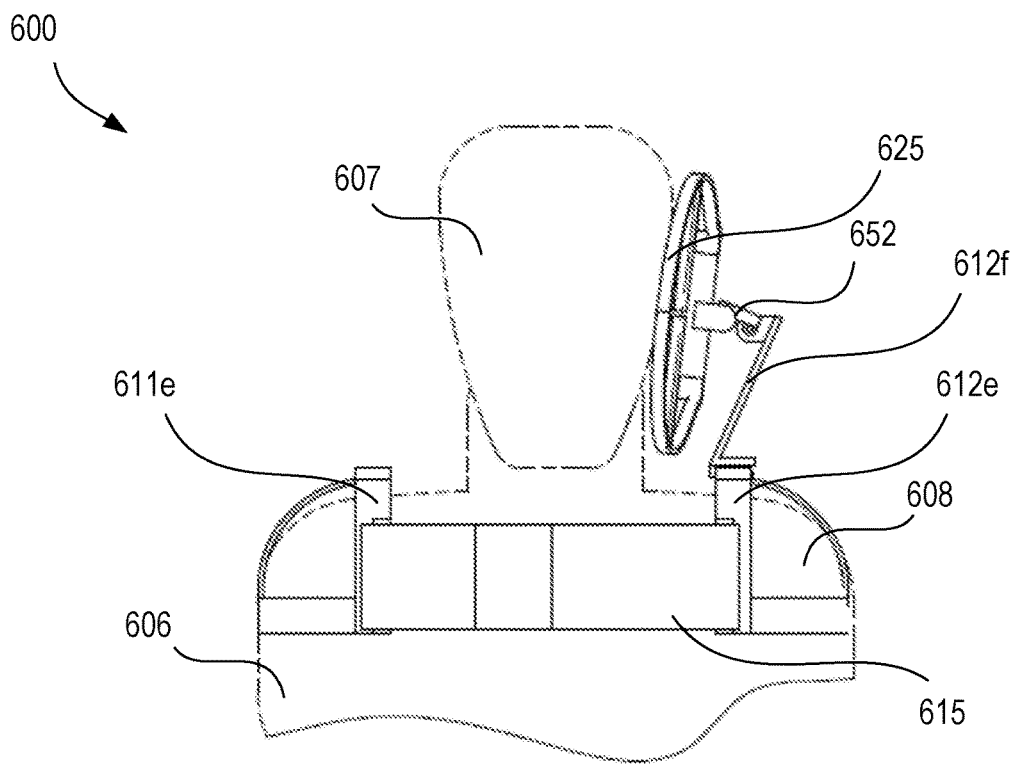
FIG. 6C shows a front view of an exemplary personal portable privacy shield in an open or deployed state with a right privacy shield attached in one of several positions, as worn on a user.

FIG. 6C shows a front view of the personal privacy apparatus 600 including only shield panel 625. For example, shield panel 620, first left support connection feature 651, and left vertical post 611f are removed from left semi-spherical base frame 611e (shoulder support) on the right side of the user 606 (from the user's perspective).

Figure 6D:
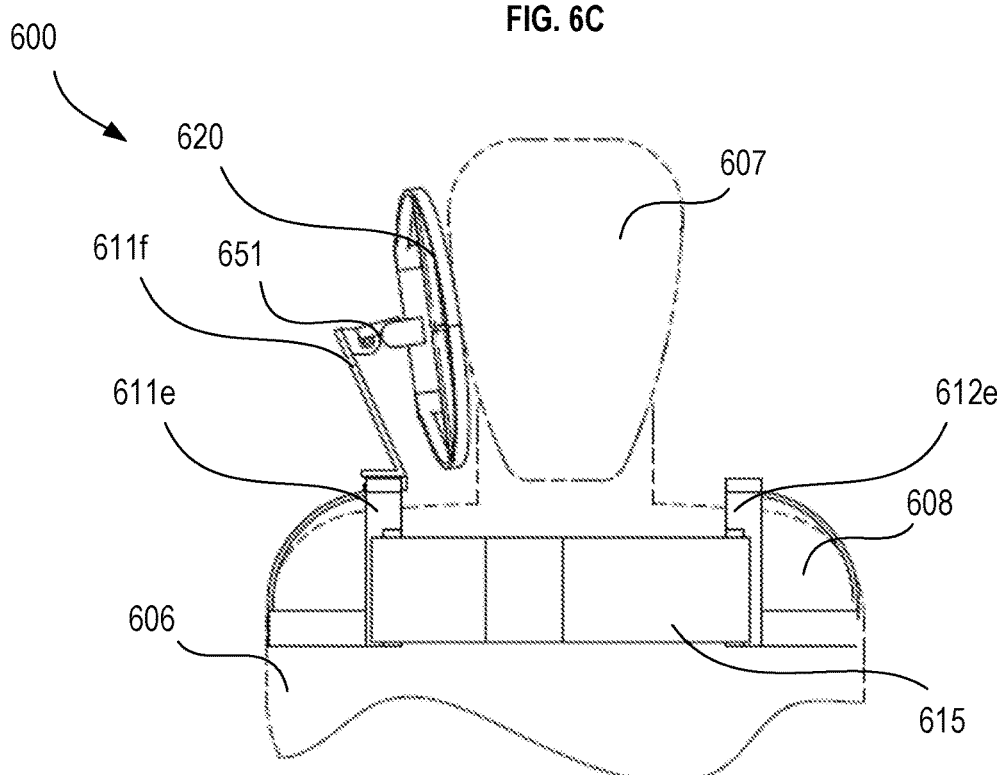
FIG. 6D shows a front view of an exemplary personal portable privacy shield in an open or deployed state with a left privacy shield attached in one of several positions, as worn on a user.

FIG. 6D shows a front view of the personal privacy apparatus 600 including only shield panel 620. For example, shield panel 625, first right support connection feature 652, and right vertical post 612f are removed from right semi-spherical base frame 612e (shoulder support) on the left side of the user 606 (from the user's perspective).

Figure 6E:
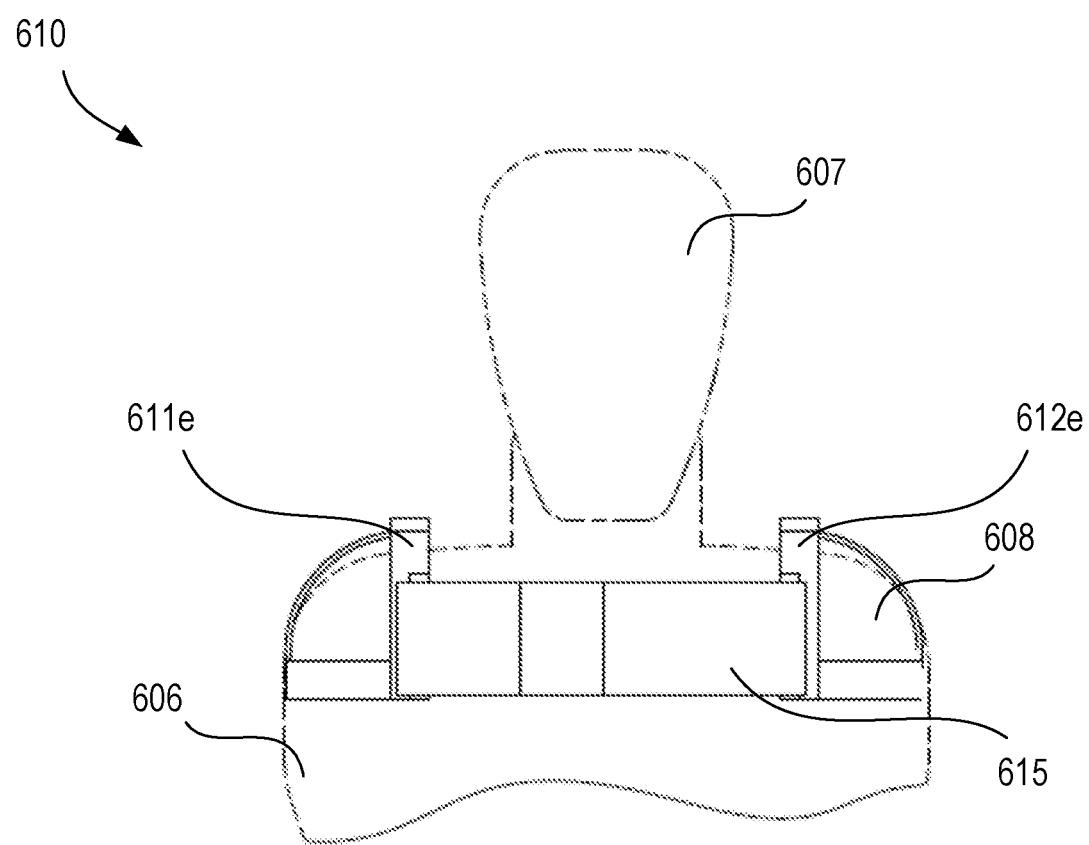
FIG. 6E shows a front view of an exemplary personal portable privacy shield in an open or deployed state with no privacy shields attached.

FIG. 6E shows a front view of the personal privacy apparatus 600 in which shield panels 620, 625, support connection features 651, 652, and vertical posts 611f, 612f are removed from semi-spherical base frames 611e, 612e (shoulder supports) on both sides of the user 606.

Figure 7B:
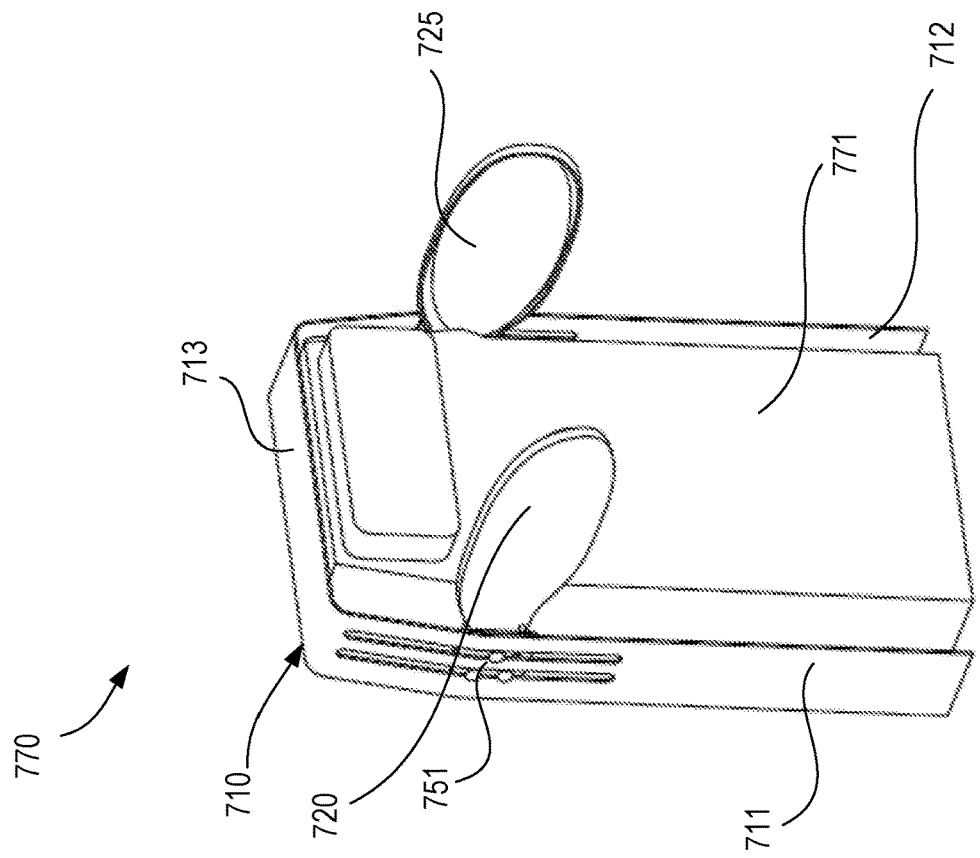
FIG. 7B shows a left perspective view of the exemplary backrest of FIG. 7A having privacy shields in an open or deployed state with both privacy shields deployed in a second vertical position.
Figure 7A:
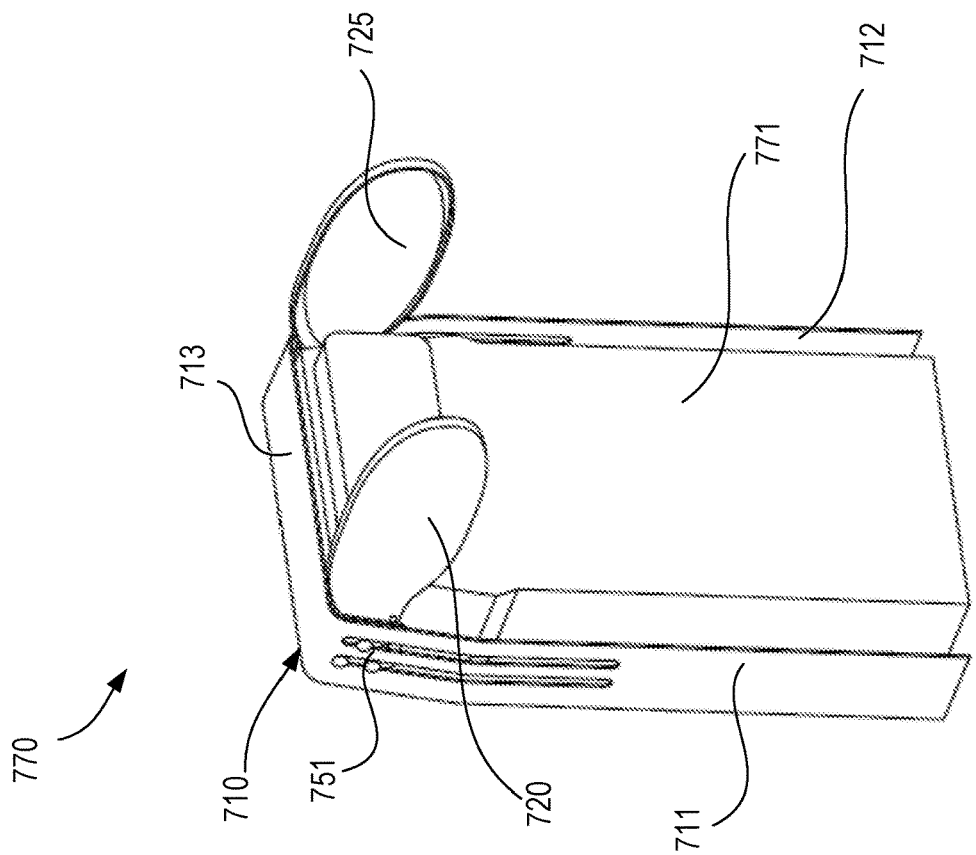
FIG. 7A shows a left perspective view of an exemplary backrest having privacy shields in an open or deployed state with both privacy shields deployed in a first vertical position.

Referring now to FIGS. 7A-7F, an example privacy apparatus is shown integrated with a backrest or backrest cushion of a seat such as a passenger seat. Backrest 770 includes privacy apparatus 700 having a three-sided frame 710 configured to align around at least a portion of a perimeter of a passenger backrest cushion 771, the frame 710 comprising a left vertical frame portion 711, a right vertical frame portion 712, and a top horizontal frame portion 713 connected to and extending between the left 711 and right 712 vertical frame portions. A first shield panel 720 is connected by a first rotatable connection 751 to the left vertical frame portion 711. A second shield panel 725 is connected by a second rotatable connection 752 (shown in FIGS. 7E-7F) to the right vertical frame portion 712. FIG. 7A depicts shield panels 720, 725 fully deployed (extended out of the frame 710) and in the uppermost vertical position. In an exemplary embodiment, when in the uppermost vertical position, the shield panels 720, 725 extend to a vertical height at least as high as the top of the backrest 770 and/or top horizontal frame portion 713. FIG. 7B shows the backrest 770 of FIG. 7A with shield panels 720, 725 fully deployed (extended out of the frame 710) and in a lower vertical position.

Figure 7D:
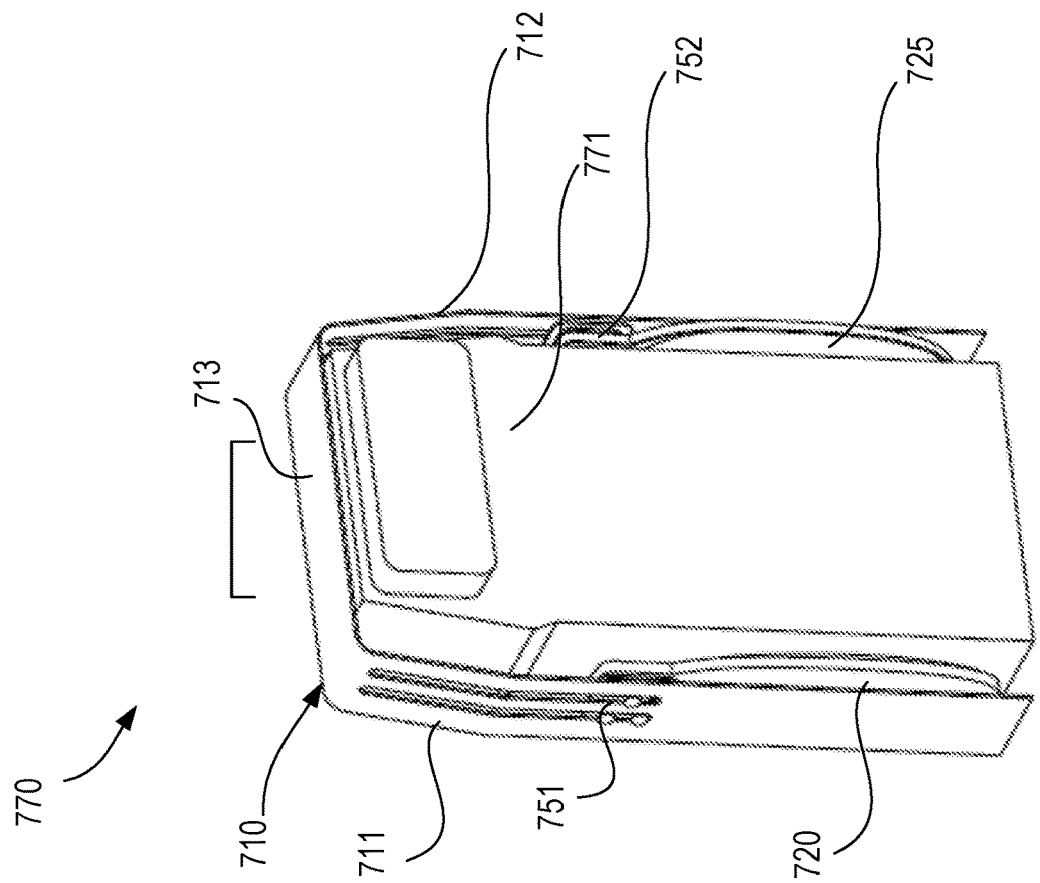
FIG. 7D shows a left perspective view of the exemplary backrest of FIG. 7A having privacy shields in a collapsed or closed state.
Figure 7C:
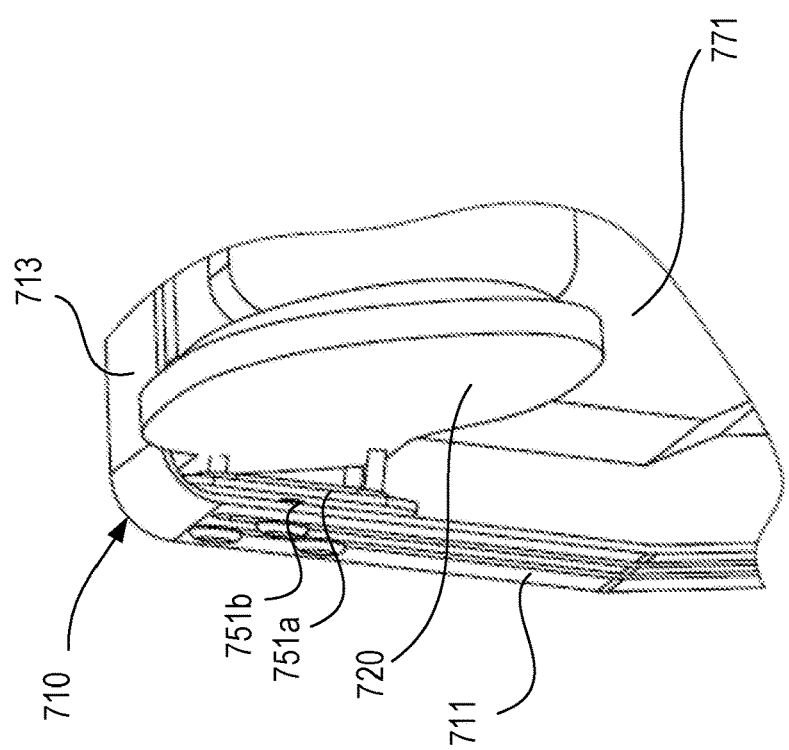
FIG. 7C shows a partial close-up perspective view of a portion of the backrest of FIG. 7A.

Referring to FIG. 7C, a close-up view of a portion of frame 710 and first rotatable connection 751 is shown. In some embodiments, such as shown in FIG. 7C, first rotatable connection 751 can include, e.g., a mounting plate 751a and a slide plate 751b. Shield panel 720 can be connected to mounting plate 751a and mounting plate 751a can be connected to slide plate 751b. Mounting plate 751a can be configured to rotate such that shield panel 720 can be rotated vertically to provide a deployed position, a stowed position, and various intermediate positions. Slide plate 751b can be configured to attach to frame 710 and allow adjustable vertical positioning of the connected mounting plate 751a and the shield panel 720 connected to the mounting plate 751a in order to allow for adjustable height of the shield panel 720 to accommodate a user's height and/or positioning preference.

Figure 7F:
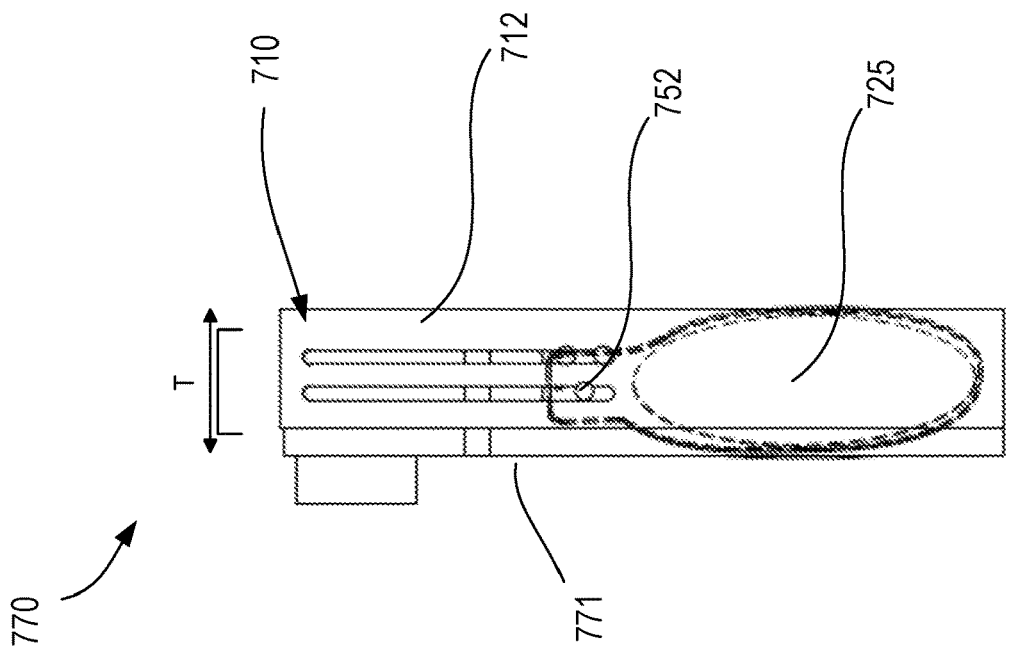
FIG. 7F shows a right side view of the exemplary backrest of FIG. 7A having privacy shields in a collapsed or closed state.
Figure 7E:
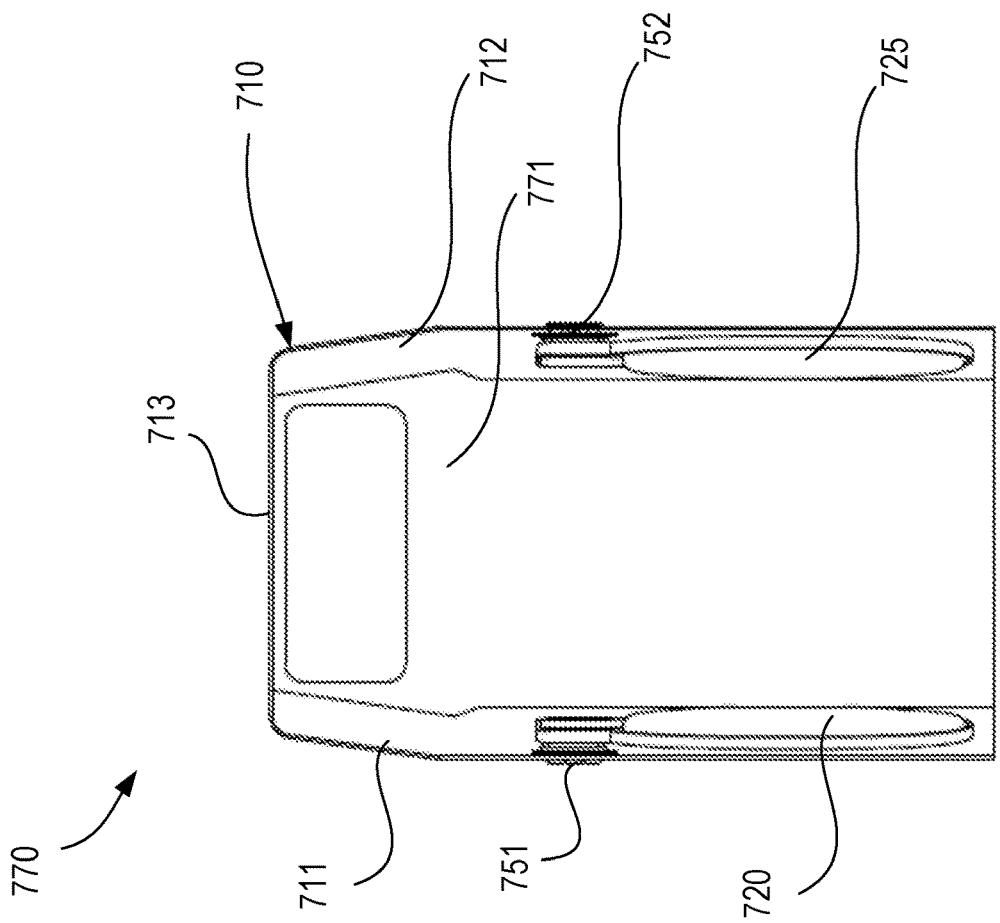
FIG. 7E shows a front view of the exemplary backrest of FIG. 7A having privacy shields in a collapsed or closed state.

Referring to FIGS. 7D-7F, shows a perspective view of the backrest 770 of FIG. 7A with shield panels 720, 725 fully collapsed in a down or stored position fitting into backrest frame 710 is shown. A stored position can provide compact storage in a position in which the user's view is unobstructed by shield panels 720 and/or 725. Alternatively or additionally, the stored position allows accessibility to adjacent seats unhindered by shield panels 720 and/or 725. In an example embodiment, a height of the shield panels 720, 725 is similar to the thickness T of backrest 770. For example, the height of the shield panels 720, 725 is less than 25% greater, less than 10% greater, less than 5% greater than the thickness T of backrest 770, or may have a height that is less than the thickness T. Accordingly, the shield panels 720, 725, may be readily accommodated in the stored position without protruding significantly from backrest 770.

The frame of the privacy apparatuses described herein can be constructed of various materials. In some embodiments, the frame can be constructed of a rigid plastic, metal, or other rigid material. Some embodiments may use multiple materials, such as, for example, embodiments where one portion of the frame (e.g. a vertical support, horizontal support, connecting member, vertical post, semi-spherical base frame, etc.) is plastic, and another portion (e.g., a vertical support, horizontal support, connecting member, vertical post, semi-spherical base frame, etc.) is metal. Some parts of the frame can be made from non-rigid or flexible materials such as flexible plastics, fabrics, and the like. For example, one or more connecting members may comprise a flexible plastic or a fabric, including an elastic or non-elastic fabric.

The shield panels can also be constructed of various materials, such as rigid plastic, metal, rigid fabric, and the like. The panel material is preferably rigid in order to maintain shape to provide the desired privacy and/or to provide head and/or neck support for a user if desired. However, in some embodiments, a non-rigid material may be used for the shield panels, such as where head and/or neck support are not desired, and/or where increased portability and decreased volume and/or weight of the collapsed privacy apparatus are desired. Non-limiting non-rigid materials include fabrics, nonwovens, flexible plastics and other polymeric materials, and the like. In some embodiments, the shield panels can be constructed of a rigid framing such as a skeletal frame to provide structure and support, then covered in flexible (e.g., fabric) or non-flexible material to provide privacy. In some embodiments, the shield panels can comprise an expandable flexible material that can be unrolled or stretched to provide a larger privacy shield than the dimensions of the shield panels.

In some embodiments, shield panels can have an optional removable cover such as a fabric or nonwoven cover that can slide on and off of the shield panels. Removable covers can provide design satisfaction, comfort, and/or more hygienic conditions by providing disposable or washable covers for the shield panels.

In some embodiments, the shield panels can include one or more cushions disposed on a user-facing surface of the shield panel. Multiple cushions can be used to provide three-dimensional topography for comfortably supporting a user's head, neck, and/or face. Cushions can be removable to accommodate user preferences. In some embodiments, cushions can be inflatable in order to provide for decreased size when storing the apparatus.

In some embodiments of the privacy apparatuses described herein, the left and right vertical supports or posts are substantially parallel to one another. In some embodiments, the left and right vertical supports or posts, or portions thereof, are not parallel or substantially parallel to one another and may instead be angled to provide a desired position of the shield panels. For example, non-parallel configuration can be used on wearable embodiments, such as those shown in FIGS. 6A-6E, or on embodiments used on backrests or passenger seats to accommodate instances where the backrest or backrest cushion has non-parallel sides.

In some embodiments, vertical supports or vertical posts may be non-linear and/or angled (e.g., relative to gravity). In some embodiments, one or more vertical supports or posts are positioned at a 90° angle relative to gravity. In some embodiments, one or more vertical supports or posts are positioned at an angle relative to gravity greater than 0°. In some embodiments, one or more vertical supports or posts are positioned at an angle relative to gravity of from about 30° to about 90°. Vertical supports or posts can, in some embodiments, be substantially straight. In some embodiments, vertical supports or posts can comprise one or more angles. In some embodiments, vertical supports or posts can comprise one or more curves. In some embodiments two or more of the connecting members can be substantially parallel to one another.

Example Embodiments

Embodiment 1. A privacy apparatus comprising:
a frame having
a left vertical support;
a right vertical support; and
a first connecting member connected to and extending between the left and right vertical supports;
a first shield panel connected to the left vertical support; and
a second shield panel connected to the right vertical support.

Embodiment 2. The privacy apparatus of embodiment 1, wherein the left vertical support has a first side and a second side opposite the first side of the left vertical support;
the right vertical support has a first side and a second side opposite the first side of the right vertical support;
the first side of the left vertical support and the first side of the right vertical support define a front side of the frame; and
the second side of the left vertical support and the second side of the right vertical support define a back side of the frame,
wherein a majority portion of the first and second panels extend in a direction outward and substantially perpendicularly from the front side of the frame.

Embodiment 3. The privacy apparatus of any one of embodiments 1-2, wherein the left vertical support and right vertical support are substantially parallel to one another.

Embodiment 4. The privacy apparatus of any one of embodiments 1-3, further comprising a second connecting member connected to and extending between the left and right vertical supports.

Embodiment 5. The privacy apparatus of embodiment 4, wherein the second connecting member is substantially parallel to the first connecting member.

Embodiment 6. The privacy apparatus of any one of embodiments 1-5, wherein:
the first connecting member is connected to the left vertical support by a first left support connection feature; and
the first connecting member is connected to the right vertical support by a first right support connection feature.

Embodiment 7. The privacy apparatus of any one of embodiments 1-6, wherein the first left support connection feature and the first right support connection feature are pivotal connections.

Embodiment 8. The privacy apparatus of any one of embodiments 1-7, wherein the first left support connection feature is disposed within a top portion of the left vertical support and the first right support connection feature is disposed within a top portion of the right vertical support.

Embodiment 9. The privacy apparatus of any one of embodiments 1-8, wherein the first connecting member is disposed between the first side and second side of the left vertical support and between the first side and second side of the right vertical support.

Embodiment 10. The privacy apparatus of any one of embodiments 4-5, wherein:
the second connecting member is connected to the left vertical support by a second left support connection feature; and
the second connecting member is connected to the right vertical support by a second right support connection feature.

Embodiment 11. The privacy apparatus of embodiments 10, wherein the second left support connection feature is disposed on the first side of the left vertical support and the second right support connection feature is disposed on the first side of the right vertical support.

Embodiment 12. The privacy apparatus of any one of embodiments 10-11, wherein the second left support connection feature and the second right support connection feature each extend in a direction outward and substantially perpendicularly from the front side of the frame.

Embodiment 13. The privacy apparatus of any one of embodiments 10-12, wherein the second left support connection feature is disposed within a bottom portion of the left vertical support and the second right support connection feature is disposed within a bottom portion of the right vertical support.

Embodiment 14. The privacy apparatus of any one of embodiments 1-13, wherein the first connecting member is rigid.

Embodiment 15. The privacy apparatus of any one of embodiments 1-13, wherein the first connecting member is elastic.

Embodiment 16. The privacy apparatus of any one of embodiments 1-14, wherein the first connecting member comprises a left horizontal support connected to a right horizontal support.

Embodiment 17. The privacy apparatus of embodiment 16, wherein the left and right horizontal supports are pivotally connected.

Embodiment 18. The privacy apparatus of embodiment 16, wherein the left and right horizontal supports are telescopically connected.

Embodiment 19. The privacy apparatus of any one of embodiments 4-5 and 10-13, wherein the second connecting member is rigid.

Embodiment 20. The privacy apparatus of any one of embodiments 4-5 and 10-13, wherein the second connecting member is elastic.

Embodiment 21. The privacy apparatus of any one of embodiments 4-5, 10-13, and 19, wherein the second connecting member comprises a left support portion connected to a right support portion.

Embodiment 22. The privacy apparatus of any one of embodiments 4-5, 10-13, and 19-21, wherein the second connecting member is disposed across the front side of the frame.

Embodiment 23. The privacy apparatus of any one of embodiments 4-5, 10-13, and 19-21, wherein the second connecting member is disposed across the back side of the frame.

Embodiment 24. The privacy apparatus of any one of embodiments 4-5, 10-13, and 19-22, wherein there is no connecting member disposed across the back side of the frame.

Embodiment 25. The privacy apparatus of any one of embodiments 1-24, wherein:
the left vertical support has a third side substantially perpendicular to the first and second sides of the left vertical support and opposite a fourth side of the left vertical support;
the right vertical support has a third side substantially perpendicular to the first and second sides of the right vertical support and opposite a fourth side of the left vertical support;
the first shield panel is connected to the left vertical support by a left panel connection feature; and
the second shield panel is connected to the right vertical support by a right panel connection feature.

Embodiment 26. The privacy apparatus of embodiment 25, wherein the left and right panel connection features are each independently configured to interact with the first and second shield panels to connect the shield panels to the vertical supports releasably, pivotally, rotatably, or any combination thereof.

Embodiment 27. The privacy apparatus of any one of embodiments 25-26, wherein the left panel connection feature comprises one or more apertures passing through the third and fourth sides of the left vertical support and the right panel connection feature comprises one or more apertures passing through the third and fourth sides of the right vertical support.

Embodiment 28. The privacy apparatus of any one of embodiments 25-27, wherein the left panel connection feature comprises a slidable connection such that the first shield panel is vertically slidable along at least a portion of the left vertical support and the right panel connection feature comprises a slidable connection such that the second shield panel is vertically slidable along at least a portion of the right vertical support.

Embodiment 29. The privacy apparatus of any one of embodiments 1-28, wherein the first shield panel is releasably connected to the left vertical support and the second shield panels is releasably connected to the right vertical support.

Embodiment 30. The privacy apparatus of any one of embodiments 1-29, wherein the first shield panel is pivotally connected to the left vertical support and the second shield panels is pivotally connected to the right vertical support.

Embodiment 31. The privacy apparatus of any one of embodiments 1-30, wherein the left and right vertical supports are each telescopically adjustable such that the length of the left and right vertical supports are independently adjustable.

Embodiment 32. The privacy apparatus of any one of embodiments 4-5, 10-13, and 19-24, wherein the left vertical support comprises a left semi-spherical base frame and the right vertical support comprises a right semi-spherical base frame, and wherein the left and right base frames are each independently configured to rest on a shoulder of a user.

Embodiment 33. The privacy apparatus of embodiment 32, wherein the first connecting member is connected to and extends between the left and right base frames.

Embodiment 34. The privacy apparatus of any one of embodiments 32-33, wherein the second connecting member is connected to and extends between the left and right base frames.

Embodiment 35. The privacy apparatus of any one of embodiments 32-34, wherein the first connecting member is connected to and extends between the left and right base frames across the front side of the frame.

Embodiment 36. The privacy apparatus of any one of embodiments 32-35, wherein the second connecting member is connected to and extends between the left and right base frames across the back side of the frame.

Embodiment 37. The privacy apparatus of any one of embodiments 32-36, wherein the left and right vertical supports each individually further comprise a vertical post extending in a vertical direction from a top portion of the base frame.

Embodiment 38. The privacy apparatus of embodiment 37, wherein the first shield panel is connected to the vertical post of the left vertical support and the second shield panel is connected to the vertical post of the right vertical support.

Embodiment 39. The privacy apparatus of any one of embodiments 37-38, wherein there is no connecting member connected to or extending between the vertical posts.

Embodiment 40. The privacy apparatus of any one of embodiments 37-39, wherein the length of the vertical posts are adjustable in the vertical direction.

Embodiment 41. A passenger seat backrest comprising a backrest cushion and the privacy apparatus of any one of embodiments 1-40.

Embodiment 42. A passenger seat comprising the passenger seat backrest of embodiment 41.

Embodiment 43. A privacy apparatus comprising:
a three-sided frame configured to align around at least a portion of a perimeter of a passenger backrest cushion comprising a left vertical frame portion;
a right vertical frame portion; and
a top horizontal frame portion connected to and extending between the left and right vertical frame portions;
a first shield panel connected by a first rotatable connection to the left vertical frame portion; and
a second shield panel connected by a second rotatable connection to the right vertical frame portion.

Embodiment 44. The privacy apparatus of embodiments 43, wherein the portion of the perimeter of the passenger backrest cushion runs along a thickness of the cushion.

Embodiment 45. The privacy apparatus of any one of embodiments 43-44, wherein the first rotatable connection is vertically slidable along the left vertical frame portion and the second rotatable connection is vertically slidable along the right vertical frame portion.

Embodiment 46. A passenger seat backrest comprising a backrest cushion and the privacy apparatus of any one of embodiments 43-45.

Embodiment 47. A passenger seat comprising the passenger seat backrest of embodiment 46.

Embodiment 48. A privacy apparatus, comprising:
means for providing a barrier between the user and a surrounding environment;
means for supporting the barrier.

While this specification contains many specific implementation details, these should not be construed as limitations on the scope of any technology or of what may be claimed, but rather as descriptions of features that may be specific to particular embodiments. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Particular embodiments of the subject matter have been described. Other embodiments are within the scope of the following claims.

As used herein, the terms "preferred" and "preferably" refer to embodiments described herein that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the particular figure. These terms are used only to simplify the description, however, and not to limit the scope of the invention in any way. Reference throughout this specification to "one embodiment," "certain embodiments," "one or more embodiments," "some embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment," "in some embodiments" or "in an embodiment" in various places throughout this specification are not necessarily referring to the same embodiment of the invention.

As used herein, the term "vertical" is used refer to orientations that are not horizontal and are angled relative to gravity. "Substantially vertical," as used herein, refers to orientations having an angle relative to gravity of from about 70° to 90°.

What is claimed is:

1. A privacy apparatus, comprising:
a first shield panel;
a second shield panel; and
a frame, comprising
a first connecting member that extends between the first shield panel and the second shield panel; and
a second connecting member;
wherein the first shield panel is configured to be positioned at a first lateral side of a user's head, and the second shield panel is configured to be positioned at a second lateral side of the user's head opposite from the first lateral side, and
wherein the frame is configured to be supported on a backrest of a seat, the first connecting member configured to rest on a top surface of the backrest while the second connecting member extends across a front of the backrest and no connecting member extends around the back of the backrest.

2. The privacy apparatus of claim 1, wherein the first connecting member is rigid.

3. The privacy apparatus of claim 1, wherein the first connecting member is configured to extend behind the user between the first shield panel positioned at a first lateral side of the user's head and the second shield panel positioned at a second lateral side of the user's head.

4. The privacy apparatus of claim 3, wherein the first shield panel and the second shield panel are configured to provide an audio and visual barrier between the user and a surrounding environment.

5. The privacy apparatus of claim 1, wherein the frame comprises a left support, and a right support, and wherein the first connecting member that extends between the left and right supports.

6. The privacy apparatus of claim 5, wherein the first shield panel is movable along at least a portion of the left support between two or more selected positions, and the second shield panel is movable along at least a portion of the right support between two or more selected positions, and wherein the first shield panel is fixedly positioned relative to the second shield panel when in a selected position.

7. The privacy apparatus of claim 6, wherein the first shield panel and the left support, and the second shield panel and the right support, each comprise complementary mating features configured to fixedly maintain the first and second shield panels in one of the selected positions.

8. The privacy apparatus of claim 6, wherein the first shield panel, the second shield panel, and the first connecting member are manually adjustable between an open configuration in which the first and second shield panels are positionable at first and second lateral sides of a user's head, and a collapsed configuration.

9. The privacy apparatus of claim 8, wherein in the open configuration, a minimum distance between the first shield panel and the second shield panel is greater than 6 inches, and in the collapsed configuration, a minimum distance between the first shield panel and the second shield panel is less than 1 inch.

10. The privacy apparatus of claim 8, wherein in the open configuration the first connecting member is perpendicular to the first shield panel and the second shield panel.

11. The privacy apparatus of claim 5, wherein the second connecting member that-extends between the left and right supports, and is connected to the left support and the right support.

12. The privacy apparatus of claim 11, wherein the second connecting member is an elastic strap.

13. The privacy apparatus of claim 12, wherein the first connecting member is rigid, and comprises a first connecting member portion and a second connection member portion, the first connecting member portion adjustable relative to the second connecting member portion.

14. The privacy apparatus of claim 13, wherein the first connecting member is telescopically adjustable relative to the second connecting member portion such that a distance between the first and second shield panels is adjustable.

15. The privacy apparatus of claim 14, wherein the first connecting member includes a hinge.

16. The privacy apparatus of claim 5, wherein first and second shield panels each comprise a padded surface.

17. The privacy apparatus of claim 1, wherein a distance between the first shield panel and the second shield panel is adjustable.

18. A method of using a privacy apparatus, comprising:
positioning a privacy apparatus on a backrest of a seat such that no connecting member extends around the back of the backrest, the privacy apparatus comprising:
a first shield panel,
a second shield panel,
a first connecting member at least partially supported on a top of the backrest when the privacy apparatus is supported on the backrest, and
a second connecting member; and
supporting a user's head on the first shield panel;
wherein positioning the privacy apparatus includes positioning the first connecting member across a top surface of the backrest and positioning the second connecting member across a front of the backrest.

19. The method of using a privacy apparatus of claim 18, comprising adjusting a distance between the first shield panel and the second shield panel.

20. The method of using a privacy apparatus of claim 19, comprising:
removing the privacy apparatus from the backrest;
manipulating the privacy apparatus from an open configuration in which the privacy apparatus is positionable on the backrest to a collapsed configuration;
wherein in the collapsed configuration, a distance between the first shield panel and the second shield panel is less than 20% of the width of the backrest.

* * * * *